(12) United States Patent
Renneckar et al.

(10) Patent No.: US 9,908,313 B2
(45) Date of Patent: Mar. 6, 2018

(54) PROCESS FOR BONDING LIGNOCELLULOSIC SUBSTRATES WITHOUT AN ADDED ADHESIVE AND PRODUCTS THEREOF

(71) Applicants: Scott Renneckar, Blacksburg, VA (US); William T. Church, New Albany, OH (US); Jeffrey A. Dolan, Christiansburg, VA (US); Robert S. Wright, Blacksburg, VA (US); Zhiyuan Lin, Blacksburg, VA (US)

(72) Inventors: Scott Renneckar, Blacksburg, VA (US); William T. Church, New Albany, OH (US); Jeffrey A. Dolan, Christiansburg, VA (US); Robert S. Wright, Blacksburg, VA (US); Zhiyuan Lin, Blacksburg, VA (US)

( * ) Notice: Subject to any disclaimer, the term of this patent is extended or adjusted under 35 U.S.C. 154(b) by 0 days.

(21) Appl. No.: 14/434,657

(22) PCT Filed: Oct. 9, 2013

(86) PCT No.: PCT/US2013/064119
§ 371 (c)(1),
(2) Date: Apr. 9, 2015

(87) PCT Pub. No.: WO2014/059010
PCT Pub. Date: Apr. 17, 2014

(65) Prior Publication Data
US 2015/0258760 A1    Sep. 17, 2015

Related U.S. Application Data

(60) Provisional application No. 61/711,499, filed on Oct. 9, 2012.

(51) Int. Cl.
*B32B 37/06* (2006.01)
*B27D 1/00* (2006.01)
(Continued)

(52) U.S. Cl.
CPC ............... *B32B 37/06* (2013.01); *B27D 1/00* (2013.01); *B27D 5/003* (2013.01);
(Continued)

(58) Field of Classification Search
CPC .. Y10T 428/31703; B27D 1/00; B27D 5/003; B27M 3/0026; B32B 2317/16;
(Continued)

(56) References Cited

U.S. PATENT DOCUMENTS

| 6,217,695 B1 * | 4/2001 | Goldberg ................. B05D 3/06 |
| | | 156/244.17 |
| 2002/0018860 A1 * | 2/2002 | Filippou .................. B05D 3/08 |
| | | 427/532 |
| 2003/0159294 A1 | 8/2003 | Whittenbury |

FOREIGN PATENT DOCUMENTS

| DE | 3517449 A1 | 1/1987 |
| GB | 1123526 A | 8/1968 |

(Continued)

OTHER PUBLICATIONS

International Preliminary Report on Patentability of Corresponding International Application No. PCT/2013/064119, dated Apr. 14, 2015, 11 pages.

(Continued)

*Primary Examiner* — Vishal I Patel
(74) *Attorney, Agent, or Firm* — New River Valley IP Law, PC; Michele L. Mayberry; Timothy D. Nolan

(57) ABSTRACT

Processes for bonding lignocellulosic substrates without an added adhesive are described. The processes of the invention may include exposing the surfaces of the lignocellulosic substrate to a rapid heating source to cause one or more physical, chemical, or other modifications on the surface of the substrate. As a result of the modifications, the surfaces may form a bond with another substrate under elevated (Continued)

Excerpt from Wust, H., P. Halter, and G. Wiedemann, Experimental study of the effect of a laser beam on the morphology of wood surfaces, 2007.

temperatures and pressures, for example, produced by a means for pressing such as a conventional hot press used in the woodworking arts. The processes allow a variety of composites such as wood materials for use in the furniture making or construction industries to be manufactured. As the processes forgo the need for petroleum-based adhesives, they are more environmentally sound and occupationally safe than prior art wood product manufacturing methods. Additionally, composite materials made by the processes of the invention are described.

19 Claims, 20 Drawing Sheets

(51) Int. Cl.
    *B27D 5/00*     (2006.01)
    *B27M 3/00*     (2006.01)
    *B32B 7/04*     (2006.01)
    *B32B 21/02*     (2006.01)
    *B32B 21/13*     (2006.01)
    *B32B 21/14*     (2006.01)
    *B32B 38/00*     (2006.01)
    *B32B 37/00*     (2006.01)

(52) U.S. Cl.
    CPC ............ *B27M 3/0026* (2013.01); *B32B 7/04* (2013.01); *B32B 21/02* (2013.01); *B32B 21/13* (2013.01); *B32B 21/14* (2013.01); *B32B 38/0008* (2013.01); *B32B 2037/0092* (2013.01); *B32B 2307/202* (2013.01); *B32B 2307/54* (2013.01); *B32B 2307/542* (2013.01); *B32B 2310/0843* (2013.01); *B32B 2317/16* (2013.01)

(58) Field of Classification Search
    CPC ........... B32B 7/04; B32B 21/02; B32B 21/13; B32B 21/14; B32B 2307/202; B32B 2307/54; B32B 2307/542; B32B 37/06; B32B 38/0008; B32B 2037/0092; B32B 2310/0843; B29C 65/02; B29C 66/91411; B29C 66/91445; B29C 66/919; B29C 66/71; B29K 2001/00
See application file for complete search history.

(56) References Cited

FOREIGN PATENT DOCUMENTS

RU      2049661 A1    12/1995
RU      2413614 C2     3/2011

OTHER PUBLICATIONS

International Search Report and Written Opinion of Corresponding International Application No. PCT/2013/064119, dated Jan. 30, 2014, 7 pages.
Balz Gfeller, E.A., "Solid Wood Joints by In Situ Welding of structural wood constituents". Holzforschung, 2004. 58:45-52.
Ganne-Chedeville, C, et al., "Wood Welding: Chemical and Physical Changes According to the Welding Time". Journal of Adhesion Science Technology, 2008. 22:761-773.
Gerber, C., Gfeller, B. "Joint connection with welded thermoplastic dowels and Wood Welding Technologies". World Conference on Timber Engineering: Conference proceedings, 2000. British Columbia, Canada.
Gfeller, B., "Wood bonding by vibrational welding". Journal of Adhesion Science Technology, 2003. 17(11):1573-1589.
Omrani, P. et al.,"Zig-zag rotational dowel welding for exterior wood joints". Journal of Adhesion Science Technology, 2007. 21(10):923-933.

* cited by examiner

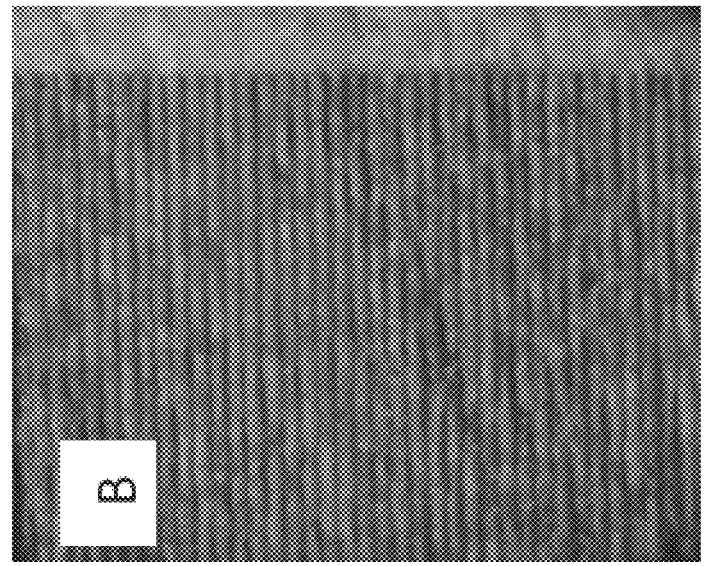
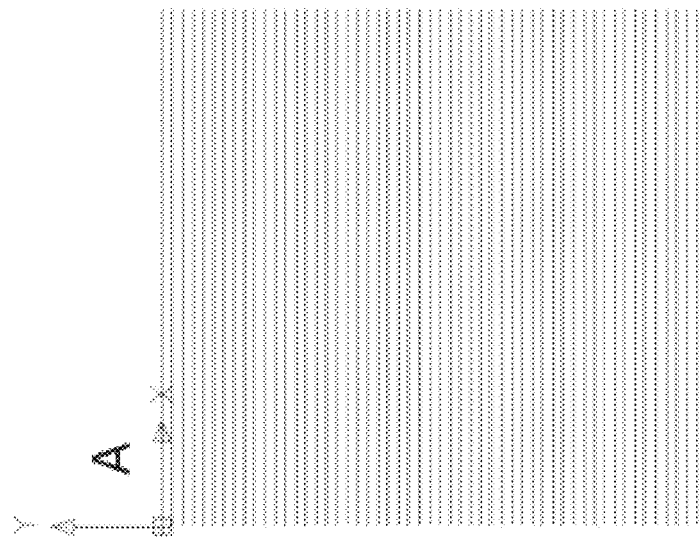
FIGS. 6A-B

FIGS. 13A-B

PROCESS FOR BONDING LIGNOCELLULOSIC SUBSTRATES WITHOUT AN ADDED ADHESIVE AND PRODUCTS THEREOF

CROSS-REFERENCE TO RELATED APPLICATIONS

This application is a National Stage application under 35 USC § 371 of International Application No. PCT/US13/64119, filed Oct. 9, 2013, which application relies on the disclosure of and claims priority to and the benefit of the filing date of U.S. Provisional Application No. 61/711,499, filed Oct. 9, 2012, the disclosures of which are hereby incorporated by reference herein in their entireties.

STATEMENT OF GOVERNMENT INTEREST

This invention was made with government support under Contract 2010-38202-21749 awarded by the United States Department of Agriculture, National Institute of Food and Agriculture. The government has certain rights in the invention.

BACKGROUND OF THE INVENTION

Field of the Invention

The present invention relates to a process for forming composite lignocellulosic materials such as wood products. More particularly, the present invention relates to a process that bonds at least two lignocellulosic substrates together to form a composite without an added adhesive.

Description of Related Art

The forest products industry has a unique opportunity to influence future building materials based on its low energy requirements for manufacturing and high performance capabilities. Engineered wood products take advantage of wood's natural strengths in certain directions for specific purposes. However products like plywood, oriented strand board, and laminated veneer lumber require the use of petroleum derived adhesives for bonding. Formaldehyde based resins and polymeric isocyanates are common because of their availability and cost benefits. Phenol-formaldehyde (PF) and Urea-Formaldehyde (UF) are synthesized from two non-renewable resources of natural gas and petroleum. Further, PF and UF adhesives are known to emit gases during production and product life that are classified as carcinogenic and can be nauseating upon significant exposure. See An Introduction to Indoor Air Quality, in: Agency E.P. (Ed.), Washington D.C., 2010, p. 4. Since 2000, governmental restrictions on wood composite adhesives has led researchers to look for wood adhesives that are sustainable, emit no harmful gases, economical, and yield performance on par with current formaldehyde wood composites. See Pizzi A., Recent developments in eco-efficient bio-based adhesives for wood bonding: opportunities and issues, Journal of Adhesion Science Technology, 20 (2006) 829-46 ("Pizzi, 2006"). Although there is research in a wide variety of renewable adhesives including tannins, carbohydrates, soy protein, and wood welding, there is only a single commercial alternative to phenol formaldehyde (PF) adhesives which is soy-based. See Pizzi, 2006. While significant progress has occurred in addressing critical issues of renewable and sustainable adhesives, the soy-based adhesive still requires some petroleum-based additives. See Pizzi, 2006. Thus, there is a clear need for alternative production methods in the wood product manufacturing industry.

With thermoplastic and metallic substrates, adhesion for the same materials can easily occur via heat as the liquid-like surfaces achieve intimate contact and form a ridged joint upon cooling. A developing area of work is in the area of laser welding that is applied industrially. Laser technology is used in many industrial materials applications for precision machining in addition to joint welding. Previous research on the laser modification of lignocellulosic materials has focused on automated machining and cutting, with other studies demonstrating utility of lasers for cleaning historical documents and wood surfaces, pyrolysis, accelerated weathering, and microtoming. See McMillin C. W., Laser machining of southern pine, Forest Products Journal, 21 (1971) 34-7 ("McMillin C. W., 1971"); C. C. Peters, H. L. Marshall, Cutting wood materials by laser, U.S. Forest Products Laboratory, Madison, Wis., 1975 ("Peters et al., 1975"); Seltman I., Freilegen der Holzstruktur durch Uv-Bestrahlung, European Journal of Wood and Wood Products, 53 (1995) 225-8; Kolar I, Strlic M., Muller-Hess D., Gruber A., Troschke K., Pentzien S., et al., Near-UV and visible pulsed laser interaction with paper, Journal of Cultural Heritage, 1 (2000) S221-S4 ("Kolar et al., 2000"); Hendrik Wust et al., Laser-induzierte Modifikationen an Holzoberflachen, Wissenschaftlich Zeitschrift der Technischen Universitat Dresden, 48 (1999) 66-72. As the polymeric components of wood are sensitive to high energy levels it is logical that these studies have focused in the above applications.

However, the earliest studies on the interaction of laser light and wood indicated that laser irradiation causes the wood surface to undergo flow. See Nordin S. B., Nyren J. O., Back E. L., An Indication of Molten Cellulose Produced in a Laser Beam, Textile Research Journal, 44 (1974) 152-4; Wust H., Haller P., Wiedemann G., Experimental study of the effect of a laser beam on the morphology of wood surfaces, 2007 ("Wust et al., 2007"); Parameswaran N., Feinstrukturelle Veriinderungen an durch laserstrahl getrennten Schnittflachen von Holz and Holzwerkstoffen, European Journal of Wood and Wood Products, 40 (1982) 421-8. The laser modified surfaces appear to have a glossy reflective surface as seen in light microscopy images. At higher magnification using a scanning electron microscope, cells were no longer clearly evident and appear to have undergone flow. Interestingly, the studies suggest that the wood surface reach a liquid-like, rubbery state during the process of laser irradiation, dependent upon the laser energy.

The novel observation that wood can be auto-adhered using frictional heat was demonstrate in a number of studies that explored how adhesive joints could be formed without added adhesive. Pizzi and co-workers applied pressure arid oscillatory vibration creating heat from friction to bond wood substrates. See Balz Gfeller et al., Solid Wood Joints by In Situ Welding of structural wood constituents, Holzforschung, 58 (2004) 45-52; Bocquet J., A Pizzi, L Resch, Full-scale (industrial) wood floor using welded-through dowels, Journal of Adhesion Science Technology, 20 (2006) 1727-39; P Omrani, H R Mansouri, G Duchanois, A Pizzi, Fracture mechanics of linearly welded woodjoints: effect of wood species and grain orientation, Journal of Adhesion Science Technology, 23 (2009) 2057-72; C. Ganne-Chedeville, M. Properzi, I M Leban; A Pizzi, F Picheilin, Wood Welding: Chemical and Physical Changes According to the Welding Time, Journal of Adhesion Science Technology, 22 (2008) 761-73. These studies identified lignin and hemicelluloses underwent softening and flow while cellulose fibers entangle, creating an entanglement network in a matrix of lignin and hemicellulose.

Significant variables identified in previous studies understanding laser modification of wood include laser wavelength (see Kolar et al., 2000; Wust et al., 2007), laser fluence (see C. C. Peters, H. L. Marshall, Cutting wood materials by laser, U.S. Forest Products Laboratory, Madison, Wis., 1975), laser movement to wood grain orientation (see McMillin C. W., 1971; Lee C. K., Chaiken R. F., Singer J. M., Charring pyrolysis of wood in fires by laser simulation, Symposium (International) on Combustion, 16 (1977) 1459-70; Barcikowski S., Koch G., Odermatt J., Characterization and modification of the heat affected zone during laser material processing of wood and wood composites, European Journal of Wood and Wood Products, 64 (2006) 94-103 ("Barcikowski et al., 2006")), moisture content (see Barcikowski et al., 2006; Wust H., Beyer E., Morgenthal L., Panzner M., Wiedemann G., Fischer R., et al., Laserinduzierte Modifikationen an Holzoberflachen, (1999)) species (see Vladimir Necesany M. K., Chemical Substance of the Glassy Amorphous Material Effused from Beech Wood During the Cutting by Laser Radiation, Bratislava Statny, 110 (1986) 13-27), and specific gravity (see McMillin C. W., 1971; Peters et al, 1975). Even further, a laser-assisted joining device is described in U.S. Published Patent Application No. 20030159294, which provides an apparatus and method for joining together the surfaces of wood by introducing laser light between the surfaces just before the surfaces are forced together and a pressure roller directly applies force at the line of initial contact between the two surfaces to ensure close contact between the closing surfaces at the same time that the closing surfaces are illuminated by the laser light. Even in light of such developments, there still exists a need for wood composites bonded in a manner that provides a strong union without adhesives.

SUMMARY OF THE INVENTION

To this end, the present inventors have made the surprising discovery that lignocellulosic materials such as wood substrates can be bonded together after laser-modification without application of an added adhesive. As a result of this discovery, the present inventors provide a novel process for bonding lignocellulosic substrates. The process includes exposing the surfaces of the lignocellulosic substrate to a rapid heating source to cause one or more physical, chemical, or other modifications on the surface of the substrate. As a result of the modifications, the surfaces may form a bond without an added adhesive under elevated temperatures and pressures that may be produced by a means for pressing, which may be a conventional hot press used in the woodworking arts. The process allows a variety of lignocellulosic composites to be formed that may be used as wood products for use as building materials or furniture. Additionally, the present invention includes composite lignocellulosic materials made by the process of the invention. As the process forgoes the need for petroleum-based adhesives, it is more environmentally sound and occupationally safe than prior art wood product manufacturing methods.

Various embodiments of the invention and aspects of these embodiments will be apparent in the foregoing drawings and written description.

BRIEF DESCRIPTION OF THE DRAWINGS

The accompanying drawings illustrate aspects of embodiments of the present invention, and should not be used to limit or define the invention. Together with the written description the drawings serve to explain certain principles of the invention.

FIG. 6A is a schematic diagram representation of an AutoCAD program used to modify a lignocellulosic substrate surface according to an embodiment.

FIG. 6B is a photograph of a poplar sample modified by a laser according to an embodiment of the invention.

FIG. 17C shows evidence of resolution limitations of equipment as line spacing was reduced to 40 microns.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In one embodiment, the present invention provides a process for bonding lignocellulosic substrates without an added adhesive, comprising:

providing a first and second lignocellulosic substrate, wherein each substrate comprises a surface intended for bonding;

pre-treating the surfaces intended for bonding of the first and second substrates by exposing them to a rapid heating source, to create a first and second modified surface prepared for bonding; and pressing the first and second modified surfaces together at sufficient pressure and temperature over a sufficient time interval to form one or more bonds between the modified surfaces, such that the two lignocellulosic substrates are bonded together to form a composite without the addition of an adhesive;

wherein the pre-treating step and pressing step are not simultaneous.

The heating source may be any rapid heating source suitable for modifying the surfaces of the lignocellulosic substrates. In a preferred embodiment, the rapid heating source is a form of irradiation. More preferably, the form of irradiation is coherent light. In embodiments, the source of the coherent light may be a laser. Non-limiting categories of laser sources that provide coherent light include solid-state lasers, gas lasers, excimer lasers, dye lasers, and semiconductor lasers. The choice of the laser will depend on the particular wavelength of light emitted and its relative absorption by lignocellulosic substrate surfaces. For example, it is known in the art that wood absorbs certain wavelengths of light better than other wavelengths.

Figure 1:
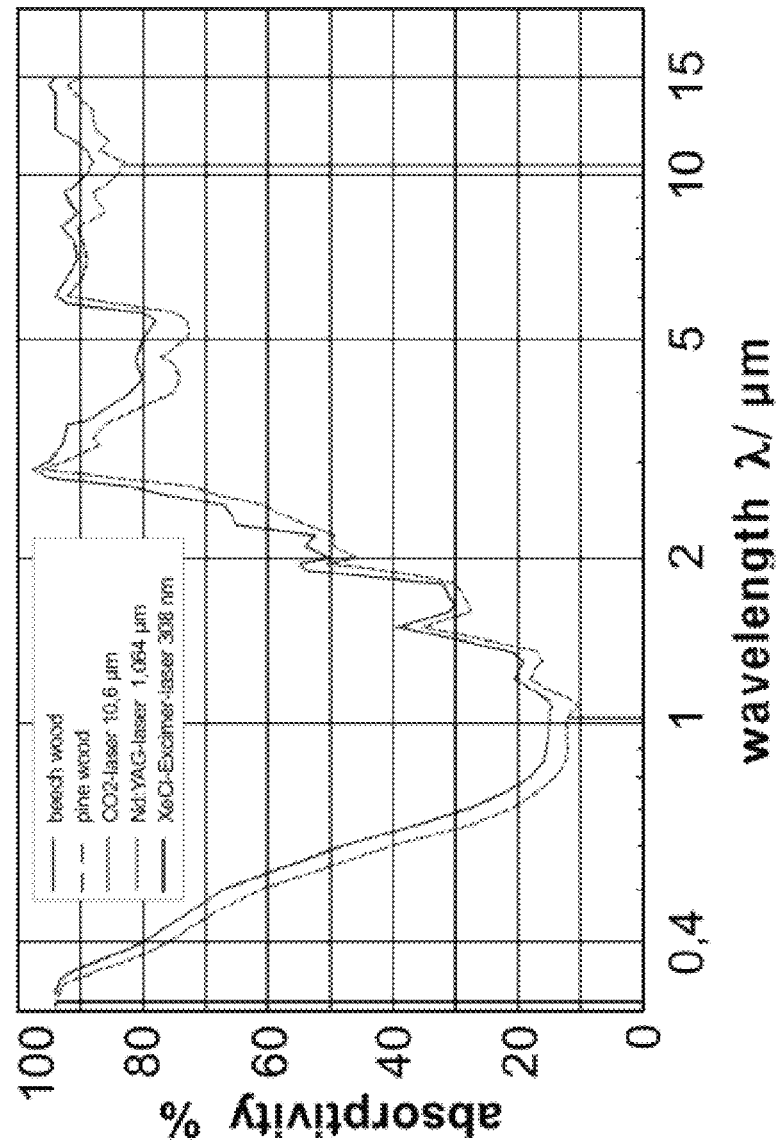
FIG. 1 is a graph showing absorptivity of wood at various wavelengths, an excerpt from Wust, H., P. Haller, and G. Wiedemann, Experimental study of the effect of a laser beam on the morphology of wood surfaces, 2007.

For choosing a particular laser for use in the process of the invention, the assumption can be made that a laser with a wavelength optimal for absorption by wood would allow for the optimal energy transfer. FIG. 1 shows the absorptivity of wood versus wavelength in the range of 0.3-15 microns. From FIG. 1 both a similarity between wood types and optimal laser types can be deduced. Beech and pine both have very similar absorptivity curves, suggesting that most woods may have similar absorptivity. While a carbon dioxide laser emitting at 10.6 microns is an exemplary embodiment of a laser for use in the invention, other embodiments include lasers emitting at a similar wavelength or lasers emitting at similar wood absorptivity values, 80% and higher. According to FIG. 1, wavelengths in the mid-infrared (3 μM-15 μM) range results in absorptivity values approaching or exceeding 80%. Therefore, non-limiting examples of laser sources available to the skilled artisan suitable for modifying lignocellulosic substrates would include a helium-neon laser emitting at about 3.391 μM, a deuterium fluoride chemical laser emitting at about 3.8 μM, lead salt lasers emitting in the range of about 3 to 30 μM, a Cr2+:ZnSe laser emitting at about 3.5 μM, a Fe2+:ZnSe laser emitting at about 3.7-5.1 μm, fiber lasers based on erbium-doped or holmium-doped fluoride fibers emitting at wavelengths at about 3 μm, and quantum cascade lasers. Knowledge of the wavelengths with optimal absorptivity for lignocellulosic substrates allows for determining a suitable laser source with minimal experimentation, along with the consideration of other factors such as the energy efficiency of the laser output.

In another embodiment, the form of irradiation is a source other than a laser. For example, if infrared light is desirable for rapid heating of the lignocellulosic substrate, a heat lamp may be used as the source of infrared light.

Preferably, a carbon dioxide laser is used to heat the surface of the lignocellulosic substrates at a line intensity of approximately 1 to 1500 W/mm$^2$. Further, the process contemplates a wide range of various laser parameters such as line spacing or spot size (beam width), speed of laser head, laser power, and laser focus that produce a line intensity in this range. Embodiments of the process of the invention may use a carbon dioxide laser with a line spacing in the range of 0.001 to 0.1 inches, a spot size in the range of 10 μM to 10 mm, a laser power in the range of 5 to 1000 Watts, a laser head speed in the range of 1 to 1500 inches/sec, a laser focus in the range of surface to 5 inches, and a pulse rate of 10,000 to 100,000 pulses/meter. It is possible that by using a Galvo mirror, the focus can be a greater distance, such as up to 5, 8, 10, or even 15 feet. The laser treatment pattern may be controlled through AutoCAD vector programs known in the art. Table 1 provides exemplary laser parameters for use in the process of the invention.

TABLE 1

| Laser treatment parameters that influence surface properties for bonding | | | | |
| --- | --- | --- | --- | --- |
| Treatment | Spot size (mm) | Laser Power (Watts) | Laser Head Speed (m/s) | Line Intensity (W/mm$^2$) |
| 1 | 0.35 | 30 | 0.25 | 1164.2 |
| 2 | 0.69 | 60 | 0.10 | 763.0 |
| 3 | 1.75 | 60 | 0.17 | 28.3 |

Not wishing to be bound by a particular theory, the rapid heating of the surfaces of the lignocellulosic substrates may modify the surfaces of the lignocellulosic substrates so that they produce chemical or physical changes such that the surfaces are able to form one or more chemical bonds, mechanical bonds, or a combination of chemical and mechanical bonds. Chemical bonds that can occur between the substrates can include for example covalent bonds, intermolecular bonds, or both. In some embodiments, treatment with a higher energy density may cause the sample surface to become grooved, increasing the surface area and allowing the development of micro-fingerjoints. In other embodiments, lower energy allows for surface modification with minimal surface removal allowing for the residual surface material to act as an adhesive layer.

Figure 2:
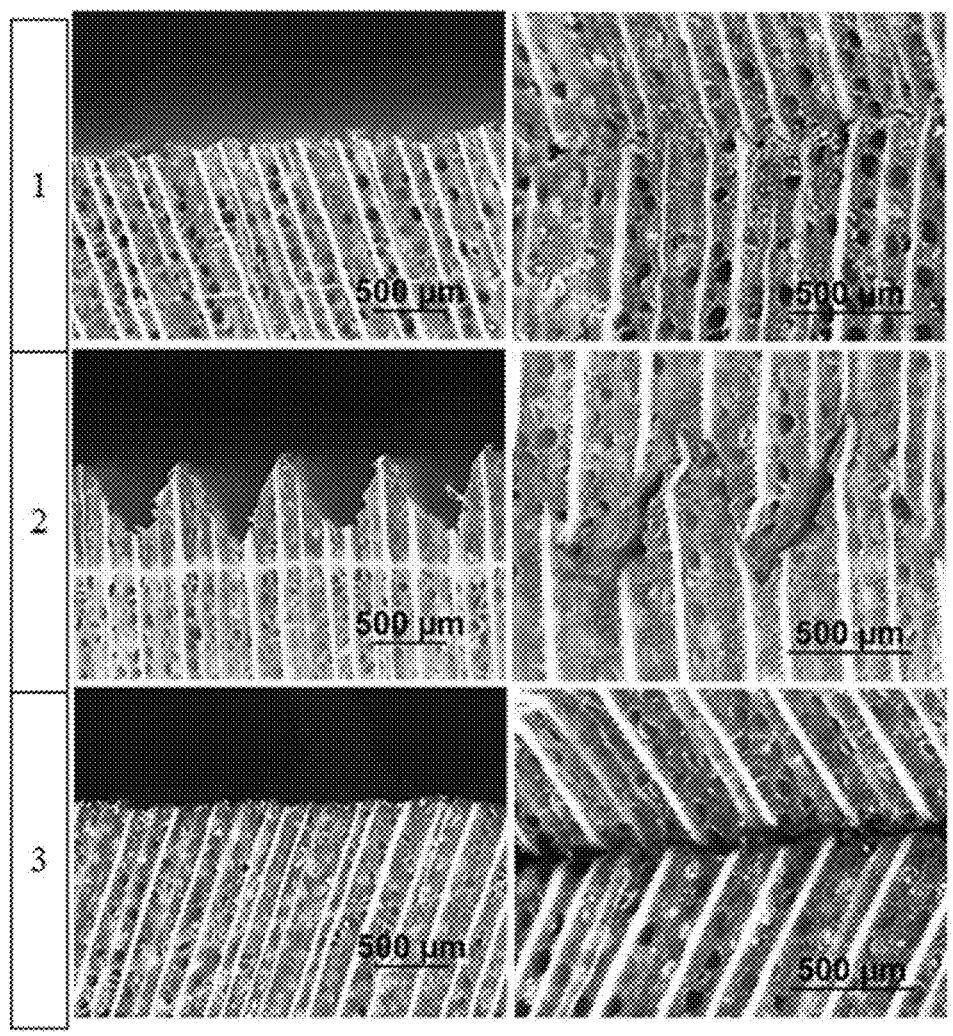
FIG. 2 provides cross sectional images of poplar wood by reflective microscope of laser-induced surface geometries according to an embodiment of the invention and subsequent bond-lines corresponding to Table 1.

FIG. 2 shows non-limiting examples of these modifications. In particular, the cross-sectional images of poplar wood by reflective microscope of laser-induced surface geometries and subsequent bond-lines correspond to the treatments outlined in Table 1. Surface geometries on the surfaces of the laser-treated lignocellulosic substrates may comprise grooves of a variety of shapes, including V-shaped grooves, U-shaped grooves, and W-shaped grooves, that may be deep or shallow, that may mechanically interlock with the grooves of an adjacent treated surface. In addition, exposure of the lignocellulosic substrates to laser energy may causes a variety of chemical reactions to occur related to the polymer components of the surface of the substrates. These chemical changes involve partial degradation of cellulose, lignin, and hemicelluloses. Table 2 shows non-limiting examples of laser modified poplar with enhanced cellulose content after laser modification. As shown in the table, the cellulose is in a different morphology than in its native state. Still further, there are mono- and oligosaccharides of degraded cellulose and hemicellulose polymers and oxidized products such as hydroxymethyl furfural, levoglucosan, and furfural. Additional lignin degradation products such as syringyl aldehyde and vanillin are found that are reactive species. In addition, the invention contemplates the formation of additional reactive species, including phenolics, aldehydes, carbonyls, and hydroxyls. Without intending to be bound by a particular mechanism, the reactive species formed on the surface of a lignocellulosic substrate as a result of laser treatment may react with those present on an adjacent laser-treated surface to form an adhesive bond through polymerization, hydrogen-bonding, or through the formation of covalent bonds. There may also be bonding by other mechanisms; the critical point is that rapid heating induces changes in the surfaces of lignocellulosic substrates that prepare them for bonding under heat and pressure. However, it is important to note that the pre-treated lignocellulosic materials can still be bonded by hot-pressing after a period of delay after the rapid heating pretreatment that allows for cooling of the materials back to ambient temperature. In embodiments, the delay between pretreatment and hot-pressing may be 5 minutes, 15 minutes, 1 hour, 4 hours, 12 hours, 24 hours, 3 days, 1 week, or several weeks.

TABLE 2

Laser modified poplar and poplar control biomass separation results in wt % using PADIC for carbohydrates

| Sample | Glucose (%) | Xylose (%) | Galactose (%) | Arabinose (%) | Acid Insoluble Lignin (%) | Ash (%) |
|---|---|---|---|---|---|---|
| Control | 47.711 | 13.049 | 0.188 | 0.767 | 21.089 | 0.299 |
| Laser Modified | 61.890 | 3.762 | 0.192 | — | 27.930 | 0.700 |

Figure 3A:
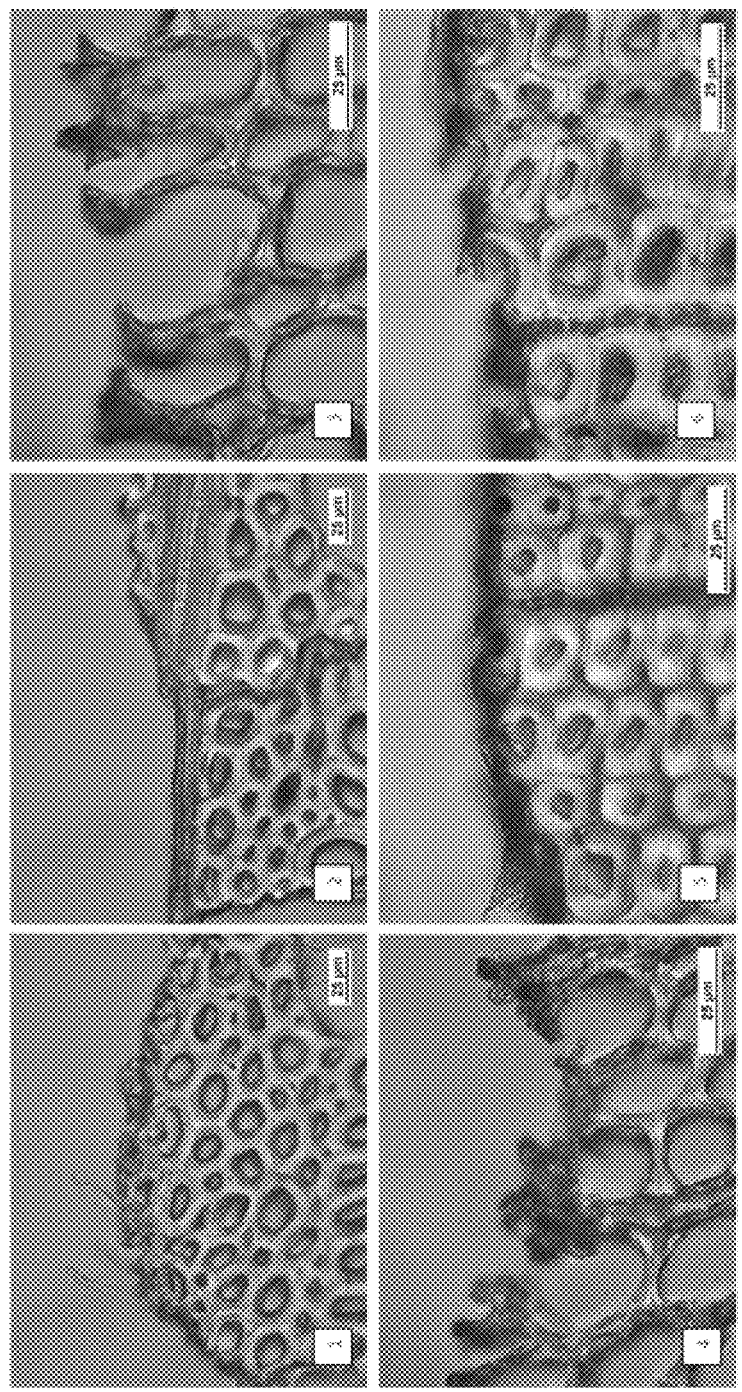
FIG. 3A shows micrographs of modified lignocellulosic substrate surfaces according to an embodiment of the invention.
Figure 3B:
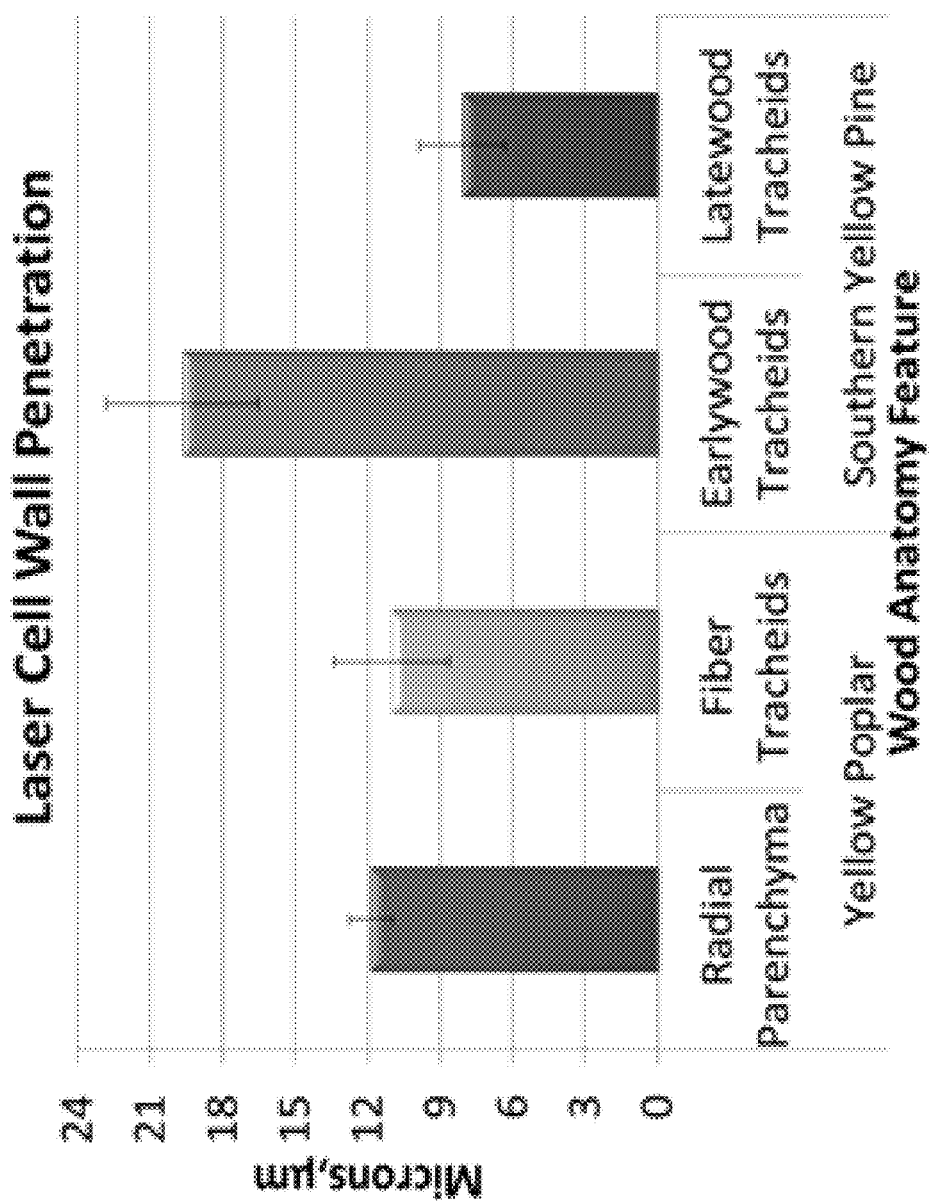
FIG. 3B is a graph showing depth measurements of examples of modified lignocellulosic substrate surfaces according to an embodiment of the invention.

*oligomeric material, cellobiose, acid soluble lignin, and extractives not included FIG. 3A shows micrographs of non-limiting examples of laser modified wood surfaces and FIG. 3B shows depth measurements of non-limiting examples of such surfaces; these show that the depth of modified wood surface is on the order of 10's of microns.

The lignocellulosic substrates may preferably be woody lignocellulosic substrates (i.e. wood substrates) including deciduous hard woods and soft woods (gymnosperms). Alternatively, the lignocellulosic substrates may be composites of hardwood and softwood fragments, such as particle board and fiber board. Non-limiting examples of hardwoods that may serve as lignocellulosic substrates in the process of the invention include poplar, beech, oak, mahogany, teak, balsa, alder, ash, aspen, basswood, beech, black walnut, cherry, cottonwood, cypress, gum, hackberry, hard maple, hickory, pecan, pacific coast maple, poplar, *sassafras*, soft maple, sycamore, red elm, red oak, white oak, willow, and birch. Examples of softwoods that may serve as lignocellulosic substrates in the process of the invention include cypress, cedar, fir, hemlock, larch, pine, redwood, spruce, and juniper. Alternatively, the lignocellulosic substrates may be non-woody lignocellulosic sources such as monocots (e.g. bamboo).

The lignocellulosic substrates can be provided at a variety of moisture contents prior to treatment with the rapid heating source, ranging from completely dry to 28%. Exemplary moisture contents of lignocellulosic substrates for use in the process of the invention are provided in Table 3. In preferred embodiments, the lignocellulosic substrates have some moisture present, ranging from 5 to 28%. Further, once the surface is modified through exposure to the rapid heating source, the lignocellulosic substrates may be immediately bonded with another piece of wood, or stored for weeks, providing a long open assembly time.

TABLE 3

Internal bond strength (IB) and compression shear block strength (shear) of laser modified wood samples that were modified and pressed under various moisture conditions and pressures

| | IB | | Shear | |
|---|---|---|---|---|
| Conditions | IB strength (psi) | SD (psi) | shear strength (psi) | SD (psi) |
| 0-0-150 | 40.78 | 22.05 | 207.57 | 39.48 |
| 0-0-300 | 54.84 | 30.91 | 315.56 | 66.68 |
| 0-6-225 | 52.34 | 20.64 | 234.79 | 43.77 |
| 0-12-150 | 44.32 | 18.15 | 253.37 | 70.96 |
| 0-12-300 | 142.36 | 27.71 | 609.77 | 61.18 |
| 6-0-225 | 89.78 | 12.46 | 308.99 | 106.67 |
| 6-6-150 | 56.55 | 10.09 | 86.60 | 30.05 |
| 6-6-225 | 94.35 | 20.32 | 320.27 | 111.05 |
| 6-6-300 | 133.91 | 28.46 | 451.74 | 83.70 |
| 6-12-225 | 134.28 | 35.27 | 358.75 | 103.47 |
| 12-0-150 | 39.32 | 6.54 | 64.61 | 26.83 |
| 12-0-300 | 40.74 | 25.14 | 290.18 | 99.18 |
| 12-6-225 | 50.44 | 16.99 | 267.17 | 74.29 |
| 12-12-150 | 62.90 | 13.83 | 196.60 | 46.12 |
| 12-12-300 | 58.55 | 16.66 | 575.08 | 202.83 |

Note:
X-X-XXX means moisture content before laser modification-moisture content before hot pressing-hot pressing pressure (PSI)

The lignocellulosic substrates may be provided in a variety of dimensions, but should have at least one planar surface intended for bonding with a corresponding planar surface of another lignocellulosic substrate. Preferably, they are provided in sheets or boards with a top planar surface and a bottom planar surface. Exemplary dimensions of the planar surfaces include 1'×2', 2'×2', 2'×3', 2'×4', 4'×4', 4'×6', 3'×7', 4'×8', and 5'×10', with thicknesses separating the planar surfaces ranging from 1/90" to 2". Thicknesses in the range of 1/90" to 1/4" are typical of wood veneer sheets, while those of 1/4" to 2" are typical of boards, including wood boards, particle board, and fiber board.

The lignocellulosic substrates are pressed together at sufficient pressure and temperature using a means for pressing over a sufficient time interval such that one or more bonds between the modified surfaces are formed. The means for pressing is preferably a conventional hot press used in the woodworking arts. In one embodiment, the pressure is at least 0.5 MPa, and preferably at least 0.7 MPa. In another embodiment, the pressure is up to 3.0 MPa, and preferably up to 2.4 MPa. Thus, a preferably range of pressures for bonding the lignocellulosic substrates is between 0.7 MPa to 2.4 MPa. In other embodiments, the pressure is preferably between 100 and 300 PSI. Further, in one embodiment, the temperature for bonding is at least 100° C., and preferably at least 140° C. In another embodiment, the pressure for bonding is up to 300° C., and preferably up to 190° C. Thus, a preferable range of temperatures for bonding the lignocellulosic substrates is between 140° C. and 190° C. As shown in Table 3, higher pressures lead to densification of the wood, but also enhance contact between bond lines.

The process of the present invention has the advantage that bonding may be achieved on an order of minutes: at least 1 minute and up to 20 minutes, and preferably between 3 minutes and 12 minutes. Processes of the present invention have the distinct advantage over the prior art in that bonding of the lignocellulosic substrates may be achieved without the use of an added adhesive, such as urea-formaldehyde and phenol-formaldehyde glues and other formaldehyde-based glues.

The process of the present invention can be used to make a variety of plywood composites, including but not limited to, 2-ply, 3-ply, 4-ply, 5-ply, 6-ply, 7-ply, 8-ply, 9-ply, 10-ply, or more. In embodiments, plywood comprising three or more layers may be formed either by bonding additional layers of wood substrate successively, or bonding them simultaneously. For example, in one embodiment, a first, second, and third wood substrate is provided, wherein one surface of the first and third wood substrate are subject to pre-treatment (e.g. irradiated), and two opposite surfaces of the second wood substrate are subject to pre-treatment. The wood substrates may then be layered such that the first and third substrate sandwich the second substrate so that the pre-treated surfaces are juxtaposed, and the stack of substrates may then be pressed at a sufficient pressure and temperature and at a sufficient time interval as described herein to form a 3-ply composite. Alternatively, a 2-ply composite may first be formed as described above, an additional surface of the composite may be pre-treated and then juxtaposed with a pre-treated surface of another wood substrate, and then the additional layer may be bonded according to the pressure, temperature, and time intervals described herein. Four-ply, 5-ply, 6-ply, or even more layers may be used to form composites, either simultaneously or in successive layers, using these methods.

Thus, in one embodiment, the present invention provides a process for forming a wood composite from at least two wood substrates comprising:

providing a first and second wood substrate, wherein each substrate comprises a surface intended for bonding;

irradiating the surfaces intended for bonding of the first and second substrates with infrared light, to create a first and second modified surface prepared for bonding; and pressing the first and second modified surfaces together at a pressure of at least 0.7 MPa and a temperature of at least 140° C. to form one or more bonds between the modified surfaces, such that a two-ply composite is formed without using an added adhesive.

In another embodiment, the present invention provides a process for forming a wood composite from at least three wood substrates comprising:

providing a first, second, and third wood substrate, wherein each substrate comprises a surface intended for bonding;

irradiating the surfaces intended for bonding of the first and third substrates with infrared light, to create a first and second modified surface prepared for bonding;

irradiating a pair of opposed surfaces intended for bonding of the second substrate with infrared light, to create a third and fourth modified surface prepared for bonding; and pressing the first and third modified surfaces and second and fourth modified surfaces together at a pressure of at least 0.7 MPa and a temperature of at least 140° C. to form one or more bonds between the modified surfaces, such that a three-ply composite is formed without using an added adhesive.

The process of the present invention contemplates modifications for production of plywood and other wood composites at industrialized scales such that the steps of the process are carried out by industrial systems. For example, in one embodiment, wood substrates in the form of boards or sheets are loaded onto a conveyor, and then feed to an irradiation station where the beam is focused and scanned across the surface by a moving arm or a Galvo mirror. The irradiation station may comprise an industrialized laser controlled through AutoCAD vector programs or other source for rapid heating to treat the surfaces of the wood substrates. The irradiated wood substrates may then be fed directly onto a second conveyor that leads to an industrial-sized hydraulic hot press. The industrial-sized hot press may comprises platens of a variety of sizes, for example, 1'×2', 2'×2', 2'×3', 2'×4', 4'×4', 4'×6', 3'×7', 4'×8', and 5'×10'. The loading and offloading to and from the conveyors may be carried out automatically, and the entire production process controlled through a computer to provide seamless production of plywood and other wood composites.

As stated herein, an additional advantage of the invention is that there may be a significant delay between pre-treating the surfaces of the lignocellulosic materials with a rapid heating source and pressing them together to bond the surfaces under heat and pressure. Thus, irradiated wood substrates need not be pressed directly after irradiation, and can even be allowed a period of time to cool prior to pressing such that they cool to ambient temperature. Thus in embodiments of a manufacturing process, the irradiated wood substrates may be off-loaded and stored prior to loading onto to the hot press conveyor.

Figure 4:
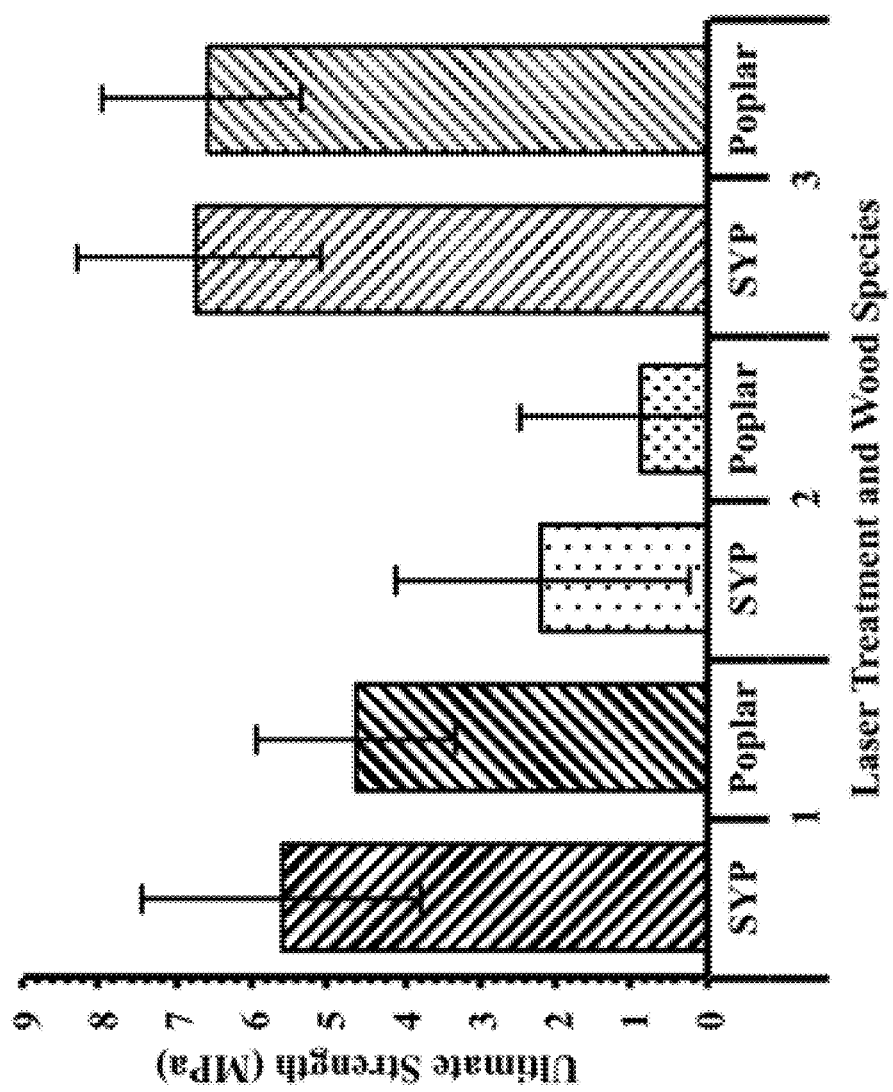
FIG. 4 is a graph showing compression shear block results of bond-line strength of non-limiting yellow-poplar and southern yellow pine examples using various laser ablation techniques according to an embodiment of the invention.

The processes of the present invention may be used to form plywood with a strength approaching or equivalent to that of solid wood. For example, Table 4 and FIG. 4 show non-limiting examples in which the ultimate strength ranged between 3 and 8 MPa, the latter approaching the shear strength of solid wood. For three-ply wood, the strength and stiffness are equivalent to phenol formaldehyde bonded samples, and shown in the non-limiting examples of Table 4.

TABLE 4

Mechanical properties of plywood prepared by laser modification compared to typical wood adhesive.

| Wood Species | Bond Method | Flexural Strength (MPa) | Flexural Modulus (GPa) |
|---|---|---|---|
| Pine | Laser | 62 ± 19 | 10.6 ± 2.5 |
| Pine | PF | 46 ± 16 | 10.1 ± 1.2 |
| Poplar | Laser | 81 ± 9 | 7.1 ± 1.1 |
| Poplar | PF | 101 ± 7 | 10.8 ± 1.0 |

Figure 5A:
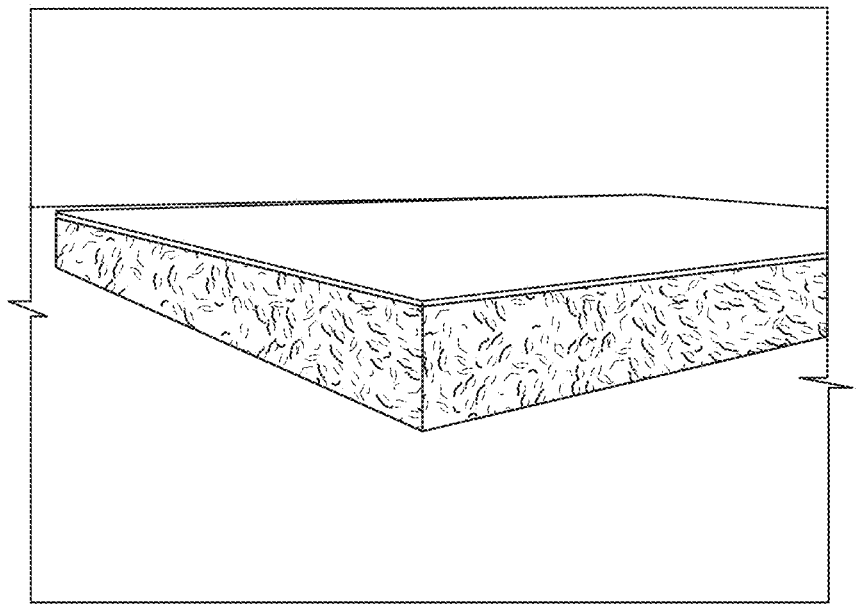
FIGS. 5A and 5B are drawings showing non-limiting examples of wood veneer bonded to particleboard (top) and medium density fiberboard (bottom) according to an embodiment of the invention.
Figure 5B:
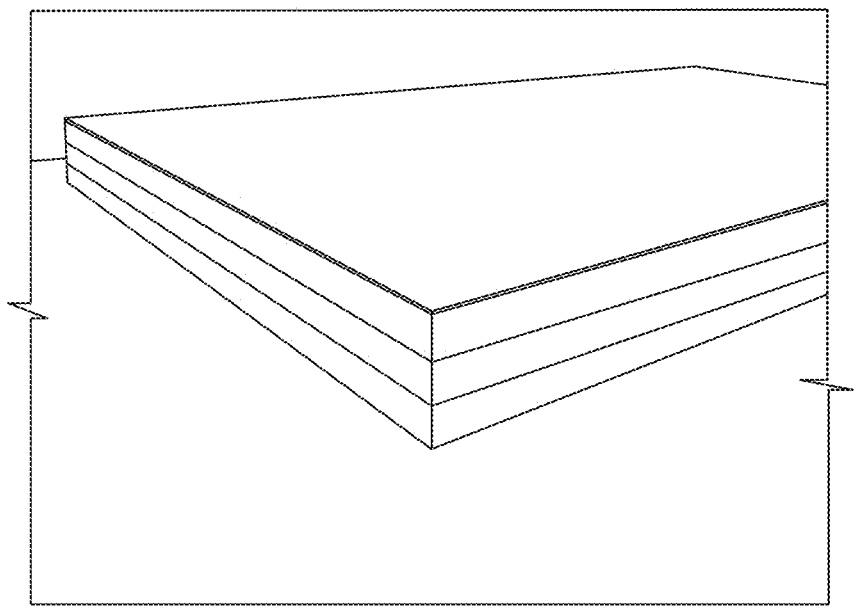

In embodiments, at least one of the wood substrates is a wood veneer substrate, and at least one of the wood substrates is a core wood panel. The wood veneer substrate is preferably raw veneer, since no adhesive is required for joining. A particular embodiment of the process of the invention comprises bonding of two wood veneer substrates that sandwich a core wood panel. Further, in embodiments, at least one of the wood substrates may include particle board and other wood fiber composites that can be laser modified and wood adhered to the surface such as decorative veneer overlays, as shown in FIGS. 5A and 5B.

Additional embodiments of the process of the invention include additional treatments to make the plywood composites water resistant. To make the bond water resistant, the bonded plywood can undergo an additional heat treatment. In a preferred embodiment, the plywood is heated at temperatures of between 150 and 250° C. for up to two hours. Further, the process contemplates the use of longer heating times to make the bonds more water resistant. Exemplary heating times and their relative water resistances are shown in Table 5.

TABLE 5

Time of heating samples in oven and the corresponding time to delamination in boiling water.

| Post heat treatment (min) | Time in Boiling water (min) |
|---|---|
| 0 | 1.2 |
| 5 | 2.3 |
| 10 | 3.3 |
| 20 | 4.5 |
| 30 | 5.7 |
| 60 | 8.3 |
| 120 | 56 |
| 240 | over 180 |

One of the many advantages of the process of the present invention, only some of which are discussed herein, is that wood products can be manufactured at an affordable cost. Energy costs were evaluated for a particular embodiment that used a line intensity of 28.2 W/mm². Laser modification of surface requires energy and this was measured via "kill-a-watt" energy monitoring system at the wall socket. Energy usage of kilowatt hour (kWh) per square inch=0.0000742 of modification was recorded using this method. The energy use involved both the fan and the laser for this particular laser table model. This level of energy use would translate to 3.42 kWh for a 4'×8' surface (1.15 kWh per square meter). As shown in Table 6, the fan energy usage dominates the process using 92% of the total energy. Thus, a 3-ply veneer composite that is ⅜" thick (two bond lines per panel) a cubic meter of composite would require (483 kWh) based on total energy. Based on US Energy Information Agency price of $0.068 per kWh for industrial sector in 2013, total cost of energy per cubic meter is $33 per cubic meter of panel product for this particular embodiment.

TABLE 6

Power consumption for laser modification for a line intensity of 28.2 W/mm².

| Run # | Elapsed Time min:sec | Power consumption kWh | kWh/sq inch |
|---|---|---|---|
| 1 | 28:44 | 0.33 | 0.00076 |
| 2 | 22:17 | 0.32 | 0.00074 |
| 3 | 22:17 | 0.32 | 0.00074 |
| 4 | 22:14 | 0.32 | 0.00074 |
| 5 | 22:14 | 0.32 | 0.00074 |
| Fan Power | | 0.30 | 0.00069 |
| Laser Only power | | 0.02 | 0.00005 |
| Laser power percentage of demand | | 6.7% | |

Amount of thickness change after wood modification is measured for different types of veneers. In general, material loss in thickness is on the order of 0.005 of an inch (Table 7).

TABLE 7

Thickness measurements of laser-modified veneers with average loss reported.

| Birch | | | Cherry | | | Oak | | |
|---|---|---|---|---|---|---|---|---|
| Un-Mod (inch) | Mod (inch) | Loss (inch) | Un-Mod (inch) | Mod (inch) | Loss (inch) | Un-Mod (inch) | Mod (inch) | Loss (inch) |
| 0.0275 | 0.0220 | | 0.0175 | 0.0140 | | 0.0250 | 0.0240 | |
| 0.0270 | 0.0220 | | 0.0190 | 0.0140 | | 0.0265 | 0.0230 | |
| 0.0260 | 0.0210 | | 0.0190 | 0.0175 | | 0.0260 | 0.0225 | |
| 0.0270 | 0.0220 | | 0.0190 | 0.0145 | | 0.0275 | 0.0245 | |
| 0.0250 | 0.0225 | | 0.0190 | 0.0140 | | 0.0265 | 0.0245 | |
| no data | 0.0245 | | 0.0185 | 0.0140 | | 0.0260 | 0.0220 | |
| 0.0265 | 0.0223 | 0.0042 | 0.0187 | 0.0147 | 0.0040 | 0.0263 | 0.0234 | 0.0028 |

The present invention includes wood products produced by a process of the present invention. More particularly, the present invention includes wood products that are formed without an added agent, such as an added adhesive, or a mechanical fastening means such as a screw, or any substance that would act to bind the substrates together other than using the substrates themselves. As used herein, an "added agent," "added adhesive" or "added wood adhesive" is an adhesive originating outside of the substrates or materials used to form the wood product. Added adhesives include conventional wood adhesives used in the woodworking arts, and are most commonly synthetic adhesives, but may also be natural adhesives. Synthetic wood adhesives are typically a thermosetting resin or a thermoplastic resin. Examples of thermosetting resins, include, without limitation, a urea-formaldehyde resin, a melamine-formaldehyde resin, a phenol-formaldehyde resin, a resorcinol-based resin, a phenol-resorcinol formaldehyde resin, or an isocyanate resin. Examples of thermoplastic resins include, without limitation, a polyvinyl acetate resin, a polyolefin-based resin, vinyl acetateolefin-based resin, polyamide-based resin, or polyurethane-based resin. A natural wood adhesive is most commonly an animal-based adhesive or a vegetable-based adhesive, but may be based on other sources. Examples of animal-based adhesives, include, without limitation, adhesives based on the hide, bones, sinews, blood, or milk of animals. Examples of vegetable-based glues include, without limitation, those derived from starch from plants such as corn, potatoes, rice, or cassava, or from protein isolated from soybeans.

In embodiments, the present invention comprises a wood composite comprising: a first wood substrate; a second wood substrate; wherein the first and second wood substrates are bonded together at a joint without an added adhesive. Such embodiments include a wood composite comprising: a first wood substrate; a second wood substrate; wherein there is a mechanical or chemical bond permanently joining the first and second wood substrates together without an added agent In another embodiment, the present comprises a wood product produced by any process disclosed herein, wherein the wood product lacks an added adhesive.

The processes of the present invention may be used to form a variety of products, including building materials, indoor veneer composites, or difficult-to-bond products like bamboo. As the processes avoid the use of petroleum-based adhesives, they are environmentally sound both with respect to consumption of resources and emissions. In particular, the elimination of added formaldehyde (a known carcinogen) allows the processes to be adopted in manufacturing settings such that they meet or exceed EPA and OSHA regulations. The processes eliminate the need for resources to acquire, store, handle, and apply resin in manufacturing settings, and are therefore immune to the market fluctuations in resin price or availability. As the strength of the products of the invention may be equivalent to adhesive-based products, they may be substituted in a variety of applications ranging from indoor furniture to building construction.

Additional examples of the processes and products of the invention, which are intended to further illustrate various embodiments of the processes and products rather than provide limitations on their boundaries, are provided below.

EXAMPLES

Example 1

Methods and Materials

The two wood species used in all the experiments were southern yellow pine (SYP) and yellow poplar. A Universal V460 60 Watt $CO_2$ pulsed laser was used modify the wood surfaces. For all the IB tests small veneer samples (2" width by 2" length by 1/8" thickness) were modified for bonding.

A miniature hot press at 180° C. and 450 psi was used to provide intimate surface interaction. AutoCAD vector programs were used to communicate with the laser for modification as seen in FIGS. 6A and 6B. The laser focus was the distance from the laser head to the sample. This distance combined with the laser power and speed makes it possible to control the depth of penetration into the surface and also the width of the laser beam. Controlling the laser makes it possible to create custom geometries that influence different degrees of mechanical interlock or chemical modification.

Several different combinations of laser treatments were explored using laser line spacing (beam width), speed of laser head, laser power, and laser focus (from lens to wood). Most initial analysis was through visual inspection of the modified surface and then bonded. Five different conditions were chosen for IB testing seen in Table 8. These had the best preliminary bonding which consisted of hand prying or tool prying techniques to determine minimum bond integrity.

TABLE 8

Specific laser parameters for Poplar and SYP veneers

| Treatment ID number | Line spacing (in) | Laser Power (Watts) | Laser Head Speed (in/sec) | Laser Focus (inches) |
| --- | --- | --- | --- | --- |
| 1 | 0.0020 | 9.6 | 20 | surface |
| 2 | 0.0145 | 30 | 10 | 2.04 |
| 3 | 0.0270 | 60 | 4 | 1.99 |
| 4 | 0.0405 | 60 | 6.6 | 2.29 |
| 5 | 0.0540 | 60 | 6.6 | 2.46 |

Figure 7:
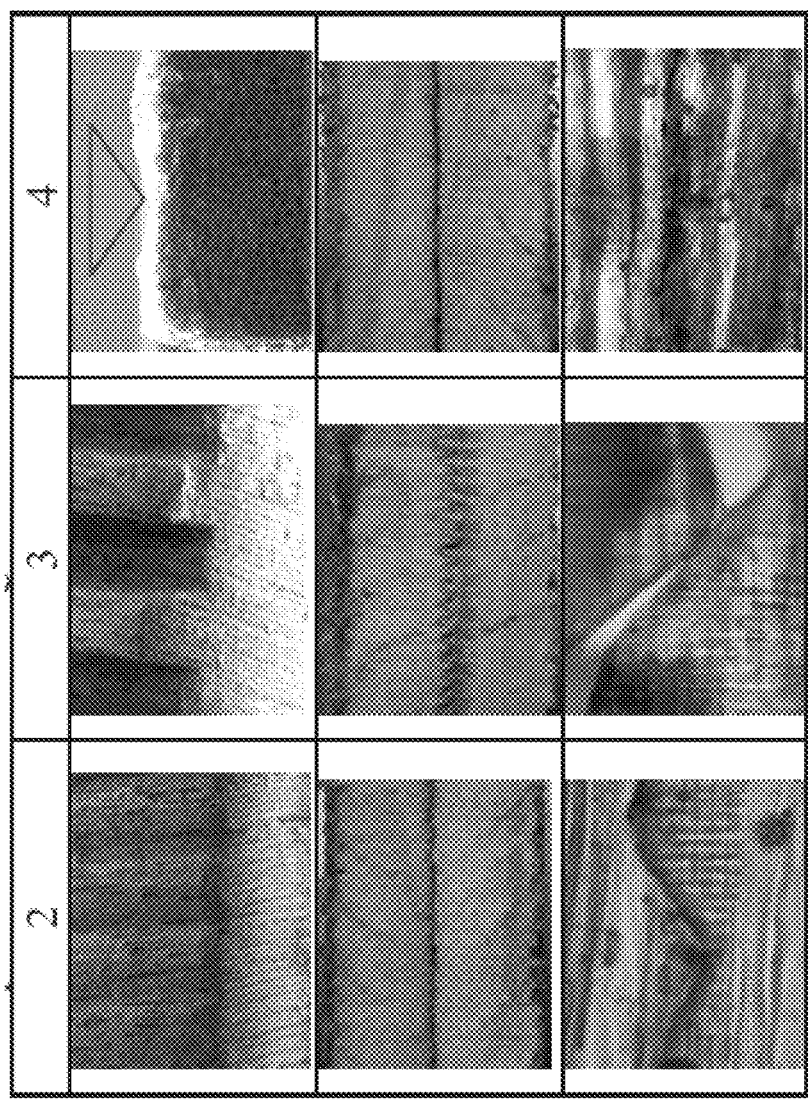
FIG. 7 shows images of modified lignocellulosic substrate surfaces and bond lines according to an embodiment of the invention. First row is 100× environmental SEM images of laser treatments 2, 3, and 4 (see Table 8). Second row is 10× dissecting microscope view of bond line. Row 3 is 400× light microscope images of the bond line.

To compare mechanical interlock and chemical change on the surface three of the samples were cut into small square pieces, lased and imaged by an environmental SEM. Also to better understand the bond line interaction dissections of lased and hot pressed samples were taken and imaged by light microscopy. These irradiated samples and bonded samples can be seen in FIG. 7.

Figure 8:
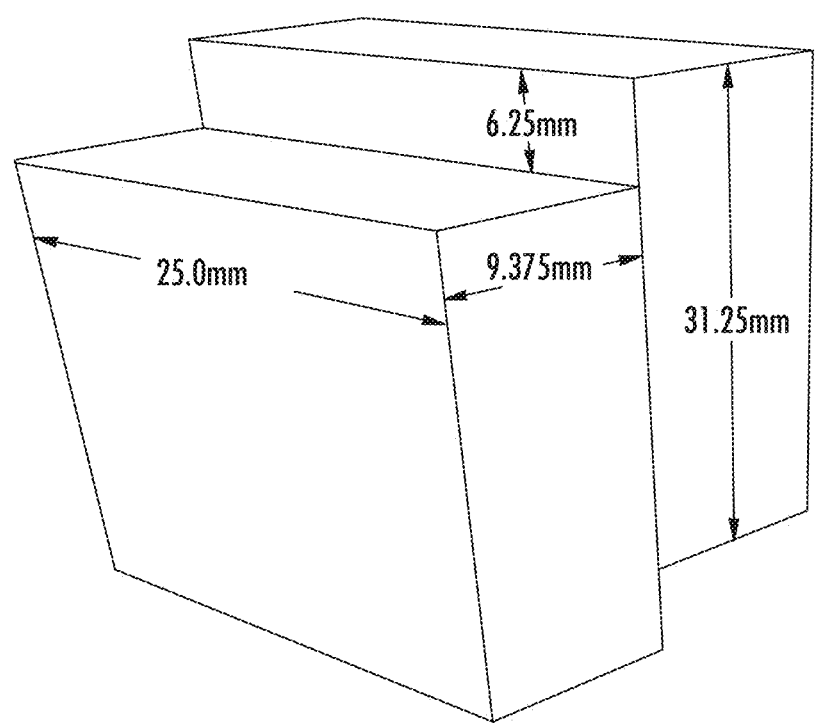
FIG. 8 is a schematic diagram representation of a compression shear block of modified ASTM D905 sample according to an embodiment of the invention.

Further inspection of the surface was done through 13C CPMAS NMR spectroscopy. Four milligrams of modified surface were scraped and dried from three different laser treatments with both wood species. Mechanical analysis is also very important in determining bond line strength so compression shear blocks were created using modified ASTMD905 testing parameters. The blocks used the dimensions given in FIG. 8. Samples were planed to thickness, lased then conditioned to 12% moisture content. Moreover, the samples were matched according to grain orientation instead of specific gravity. The samples were then bonded at 300 p.s.i. at 180° C. for 10 minutes. Bonded samples were conditioned again at 12% moisture content and then machined to final dimensions. After the shear block samples were cut they were again conditioned in 12% moisture content until tested. All tests were conducted in the dry state none were weathered or tested wet.

Results and Discussion

Figure 9:
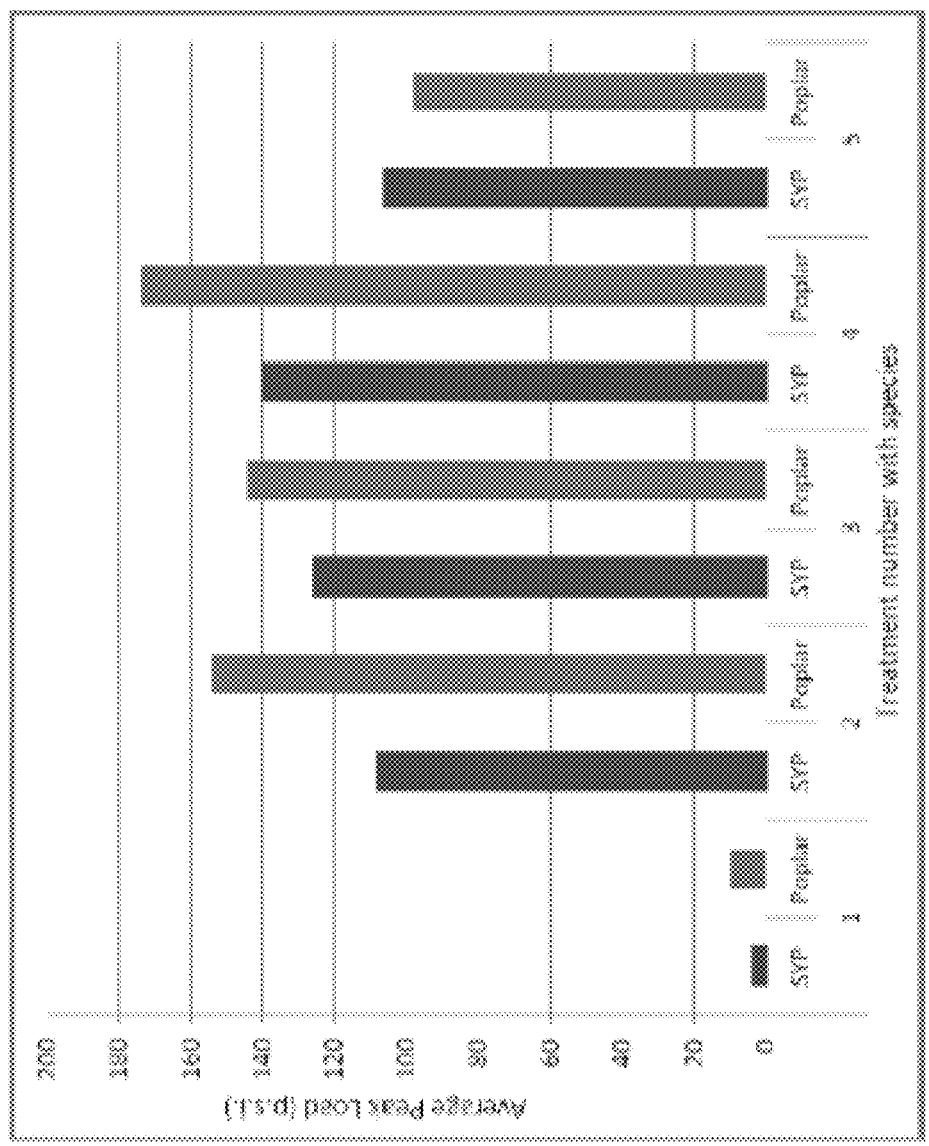
FIG. 9 is a graph showing IB test results average peak load (p.s.i.) vs. laser treatment with species variation according to an embodiment of the invention (see Table 8 for laser treatments).

Concerning the IB tests the five initial laser treatments and corresponding data are show in FIG. 9. These preliminary IB tests were used to focus the research on which conditions produced the best bonds and which treatments could be eliminated.

After examining the data from FIG. 9, it was determined that laser conditions 2, 3, and 4 were most effective and also time efficient which important from an industrial perspective. These conditions were the most variable in mechanical interlock and chemical modification. Laser treatment 2 creates small wavelike modifications on the surface which causes partial flow and partial mechanical interlock between the surfaces. Laser condition 3 has the least amount of chemical modification and creates the most mechanical interlock. The mechanism in condition 3 is most similarly related to large wood element bonding called finger jointing but this occurs at the microscopic level so it has been identified as "Micro-finger joints." Laser condition 4 has the broadest laser beam width and least surface penetration. This effect is mainly chemical because there is little geometric influence on frictional bonding or mechanical interlock. Since the IB tests resulted in similar values between conditions 2, 3, and 4 compression shear block tests were important for ultimately finding the best bond line and comparing those values to other adhesive systems.

Figure 10:
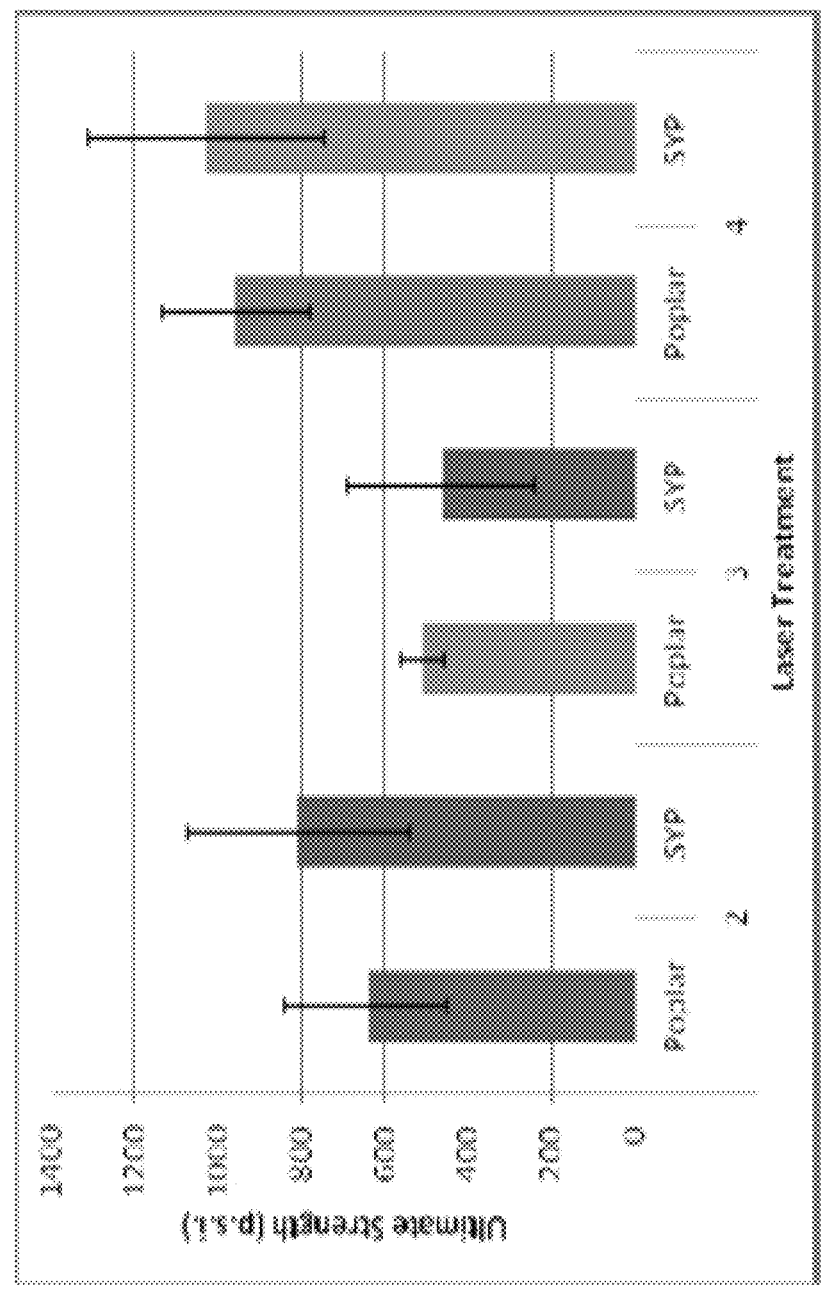
FIG. 10 is a graph showing compression shear block analysis of laser treatments (see Table 8) and ultimate strength values according to an embodiment.

The results of the compression shear block tests can be seen in FIG. 10. Laser treatment and wood species effected bond line strength. SYP outperformed poplar in most cases, exceptions are in laser treatment 3 where the standard deviation of 3 SYP is so variable that these results are unclear. Laser treatment also had an effect on bond line strength where laser treatment 3 had the least adhesive properties, 2 had intermediate adhesive effects, and 4 observed the greatest bond line strength. Simultaneous comparisons of wood failure also help to determine the effectiveness of a bond line. The poplar samples experience no wood failure meaning the adhesive technology is not stronger then the wood itself.

However with the SYP samples only one laser condition experienced a notable amount of wood failure. Condition 4 produced an average wood failure rate of ⅓ of the bonded area. The highest wood failure was 85%.

Figure 11:
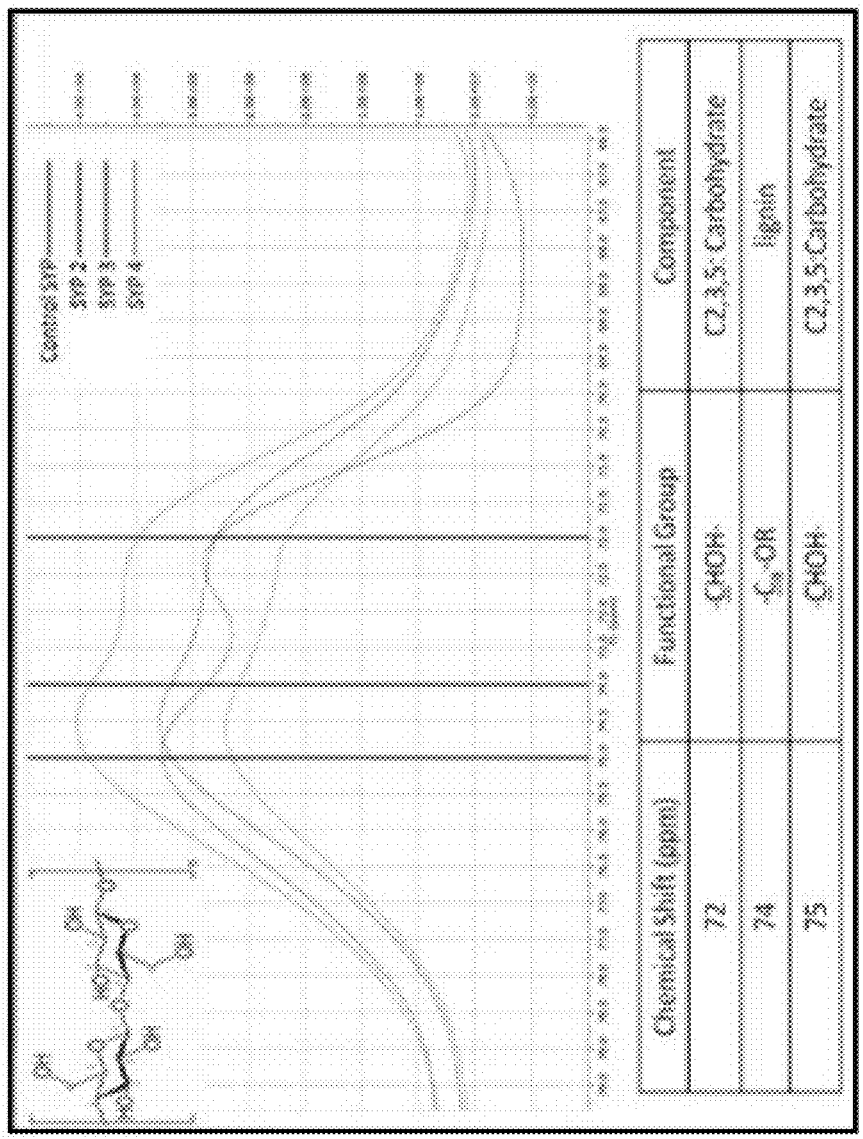
FIG. 11 is a graph showing $^{13}$C CPMAS NMR spectroscopy overlapped data series showing chemical shifts from 66 ppm to 80 ppm for SYP lased samples according to an embodiment of the invention.

To understand the surface phenomenon happening during the different irradiation conditions $^{13}$C CPMAS NMR spectroscopy was conducted and is seen in FIG. 11. Two outstanding observations were made one being that the highly crystalline cellulose was becoming more disordered. The possible melting of cellulose is seen in the C4 and C6 peak shifts from the control where the upfield shoulders increase in intensity. The other is related to the increase in the relative lignin content at the surface without much change to the lignin structure.

Condition 4 had the most chemical modification meaning that the interfacial interactions between wood surfaces are interacting through secondary interactions and not by mechanical interlock. Laser condition 4 compared to the other laser treatments is the most practical because it's penetration into the wood surface is the least, its ablation time is the least (less energy and faster processing time), and it produced the highest strength values in every test.

Conclusion:

Bonding wood by laser modification has potential in creating petroleum free wood composites. The preliminary research shows promising results particularly in the chemical modification of the wood surface. Introducing the surface to intense light energy effectively makes the cellulose and other wood components (lignin and hemicelluloses) flow. Under heat and pressure these polymers reactivate forming a bond between the surfaces. The result is a brittle yet strong bond line.

Moreover, the energy required for bonding is very small, especially paired with the fact that it can be bonded at 12% moisture content saving in drying costs. This type of research shows the innovations that are necessary in the forest products industry that will make it more environmentally friendly.

Example 2

Materials and Methods
Materials
3.2 mm thick "Grade A" Yellow-poplar (*Liriodendron tulipifera*) and southern yellow pine (*Pinus* spp.) rotary-peeled veneer were obtained from a southeastern US laminated veneer mill. The as-received 60×60 cm samples were conditioned to 12% moisture content in a walk-in environmental humidity controlled room.

Methods

Wood veneer samples were cut into 5 cm squares and modified utilizing a ULS-V460 60 W carbon dioxide laser with high power density focusing optics, resulting in a circular spot size with a diameter of approximately 50 μM. For the design of experiment testing, laser wattages of 3 to 15 W were utilized, with the laser moving at a constant 0.5 m/s, at 40,000 pulses per meter. Specific parameters utilized in the ULS print driver included a maximum image density of 6, tuning of zero, while utilizing vector mode. The trajectory of the laser was designed in AutoCAD, using the smallest resolution usable by the laser between lines, 0.002 in (50.4 μM) to irradiate the surface.

Figure 12:
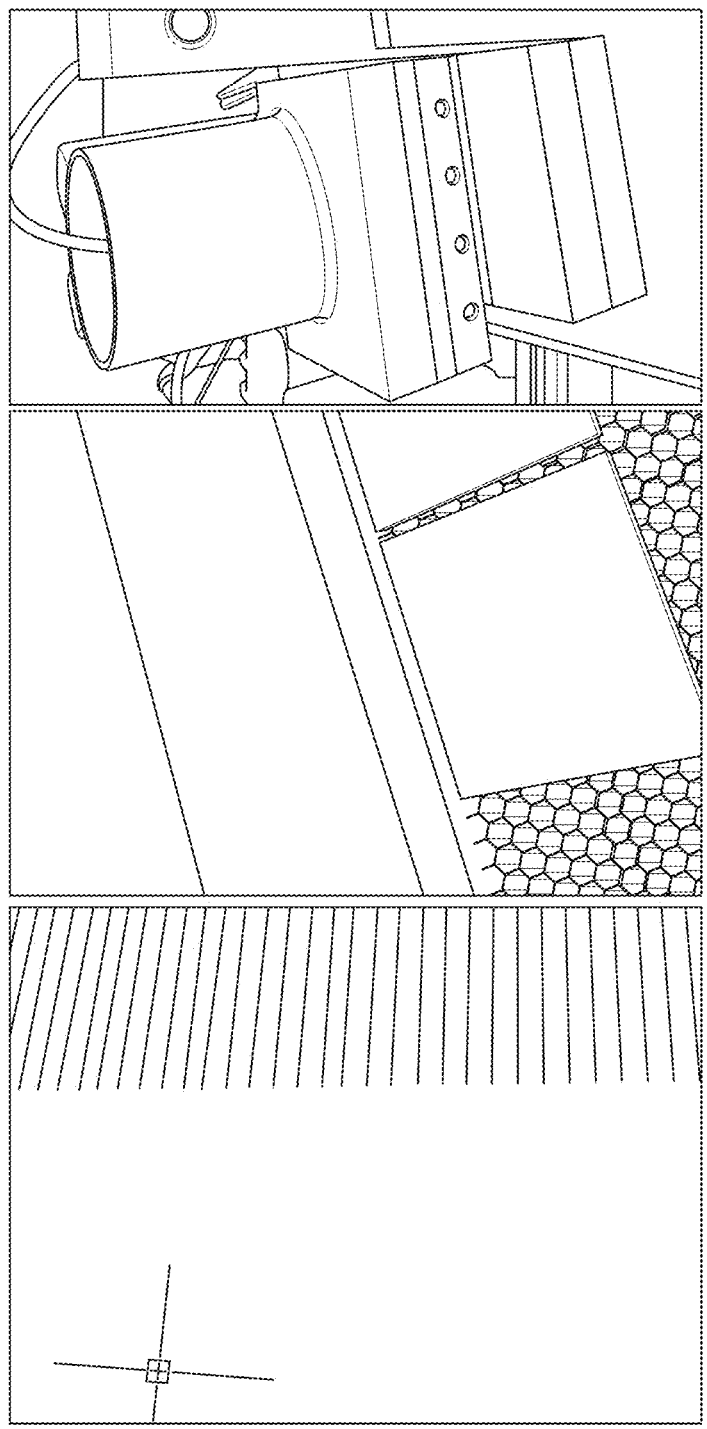
FIGS. 12A-12C are drawings showing an AutoCAD design, a laser transferring design, and a wood mini hot press, respectively, according to an embodiment of the invention.

Laser modified samples were placed in contact matching their irradiated surfaces and subsequently hot pressed together utilizing a MP2000 mini hot press. Press conditions were the following: time ranged between 3-12 min; pressure between 0.7-2.4 MPa; and temperatures between 140-190° C., controlled by a TC2 Temperature controller (both instruments made by Micromet Instruments, Inc.). The time between laser modification and hot pressing ranged from 5 minutes to 3 days; with no detectable difference in bond strength. A diagram of the design and laser modification process is shown in FIGS. 12A-12C.

Control samples were made with a commercial phenol formaldehyde adhesive. A PF resol resin for veneer applications from Georgia Pacific containing 59.93 Conradson Carbon Residue (CCR) with a total mixture weight of 800.1 grams was applied at a spread rate of 0.442 kg/m$^2$. The samples were immediately hot pressed at 1.03 MPa (150 PSI), for 10 m at 200° C.

Mechanical Testing

Figure 13:
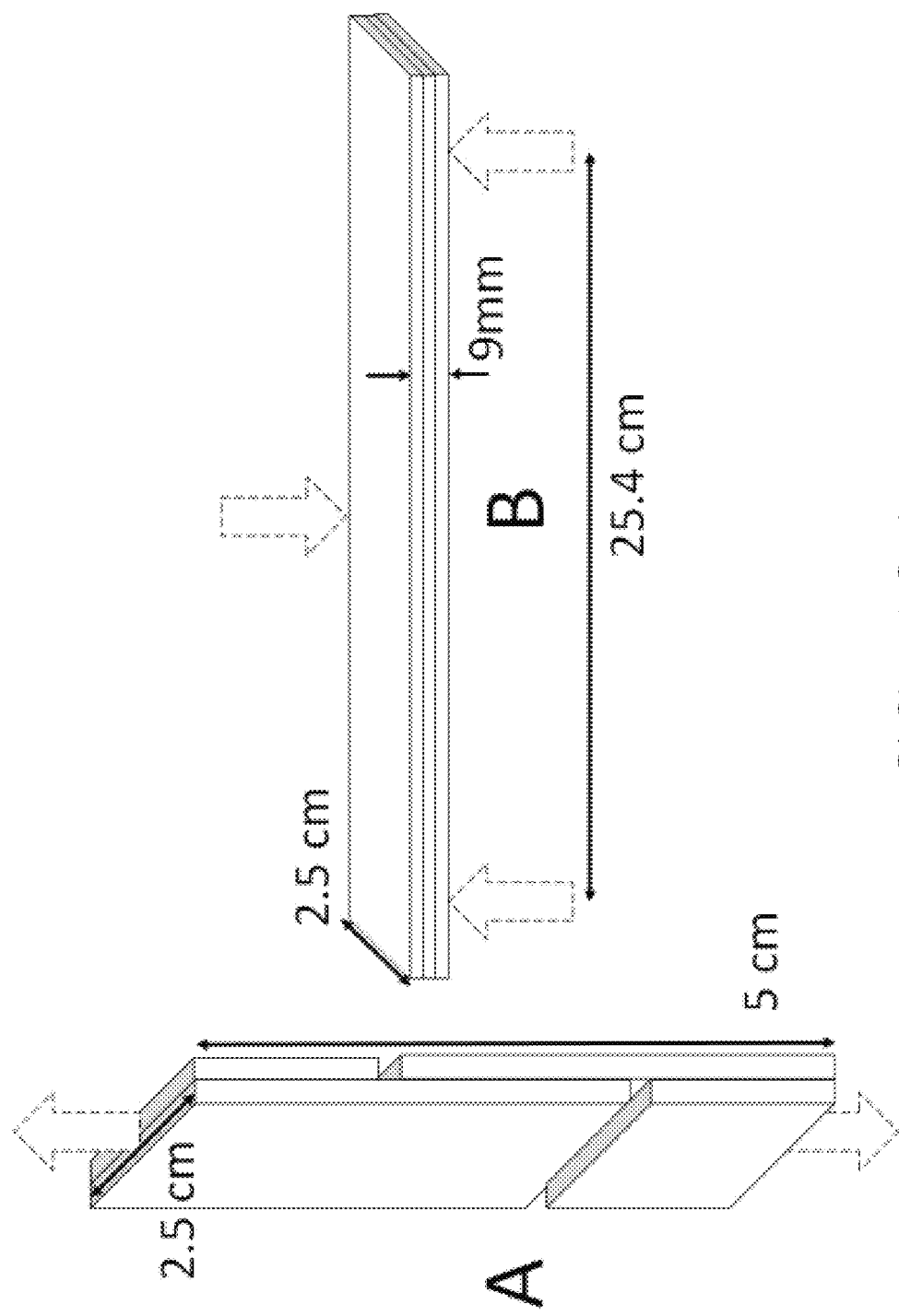
FIGS. 13A and 13B are diagrams of mechanical test methods of tensile shear strength and flexural strength, respectively, according to an embodiment.

Samples were tested via a modified version of the EN 204 shear tensile test, differing only in sample size. A band saw was used to notch the specimen to the bond line, being careful to ensure consistency in cutting depth (overcuts were removed, while undercuts were recut). Samples were hand tightened in a MTS test frame and strained in tensile mode at a rate of 0.1 in/min monitored with a 30,000 Newton load cell. Samples were measured with microcalipers to determine area between notches. A modified version of the ASTM D 3043 3 point bending for flexural strength was used for comparisons to PF industrial adhesives, modified in accordance to FIGS. 13A and B, differing in sample size. Three-ply samples were created using the optimized laser and press conditions. Displacement of the specimen was measured using a linear voltage differential transformer (LVDT) and load recorded with a: 30,000 Newton load cell. Tensile shear strength test specimen's grain direction was parallel to the long side of the test specimen. Flexural strength test specimen's grain directions of outer plies were parallel to the long side of the specimen, while the inner ply was perpendicular. For each treatment, X samples were tested from at least two different boards. 10 samples were tested for each combination, each set cut from one 30.5 cm square 3 ply composite.

DOE Method

Initial screening and knowledge about the process to optimize is vital for choosing appropriate variables, known as factors, and the associated levels for each factor. The factors and associated levels hypothesized as significant were then entered into JMP8 DOE software, specifically a custom design, using the response surface method, resulting in a matrix of tests to run. After completing the experiment, which included 4 test runs, the resulting mechanical test data was compiled for the DOE analysis. When analyzing the DOE, the most significant main level factors and interactions were included while less statistically significant variables were systematically excluded. The DOE was analyzed by running a model that investigated the effect of more significant variables, with a model "personality" of standard least squares and an "emphasis" on effect screening (two options in JMP). By removing the less significant factors the estimations of optimal significant factors were improved.

Results

Earlier results indicated that after irradiating wood with a laser, the modified wood surface underwent flow after being heated above 130° C. See Church W. T., Renneckar S., Controlled modification of wood surfaces with laser light, Virginia Polytechnic Institute and State University, Blacksburg, 2010 unpublished ("Church and Renneckar, 2010"). After laser modification, even after a few days, the wood surfaces adhered to another modified wood surface under time, temperature, and pressures typically found in normal wood composite manufacturing. Images of the modified surface and bonded specimens are displayed in FIG. 14.

Figure 14:
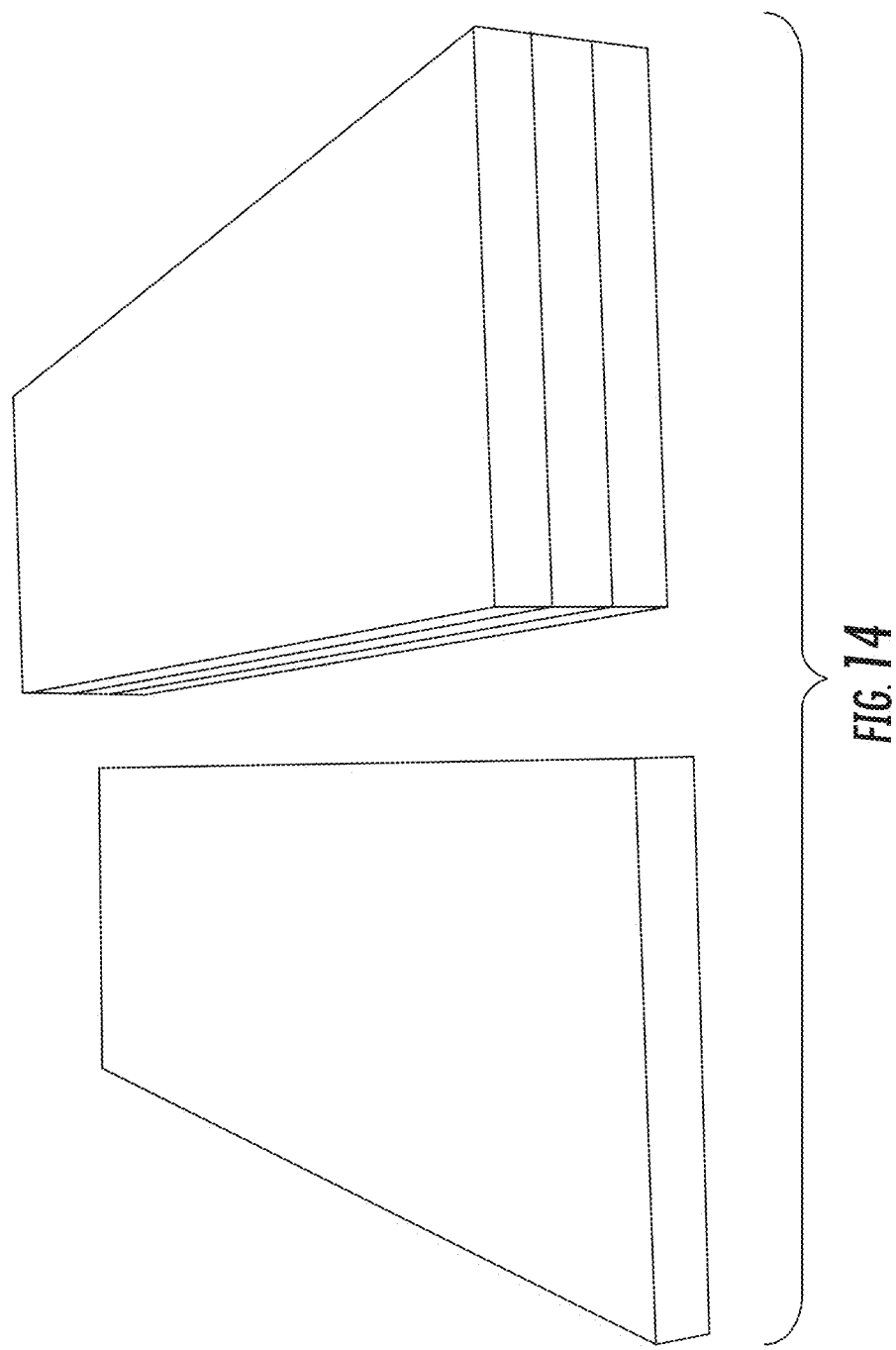
FIG. 14 is a drawing showing laser modified poplar (left) and 3-ply bonded poplar (right) after hot-pressing according to an embodiment of the invention.

FIG. 14 shows the laser-modified poplar veneer and laser-modified poplar that has been bonded into a 3 ply wood composite. In comparison to unmodified poplar (top surface of wood composite), the laser modified surface is darker, and upon light microscopy, appears to have flowed and melted. Various ladder studies were undertaken, some without mechanical testing; in order to understand the factors that affect laser activated bonding of wood, and levels of the factors that were significant. Because of the dearth of literature in this area, all tests are described below in the initial screening section, providing insight and justification for the parameters chosen for the DOE experiments.

Initial Screening

Laser Speed

Figure 15:
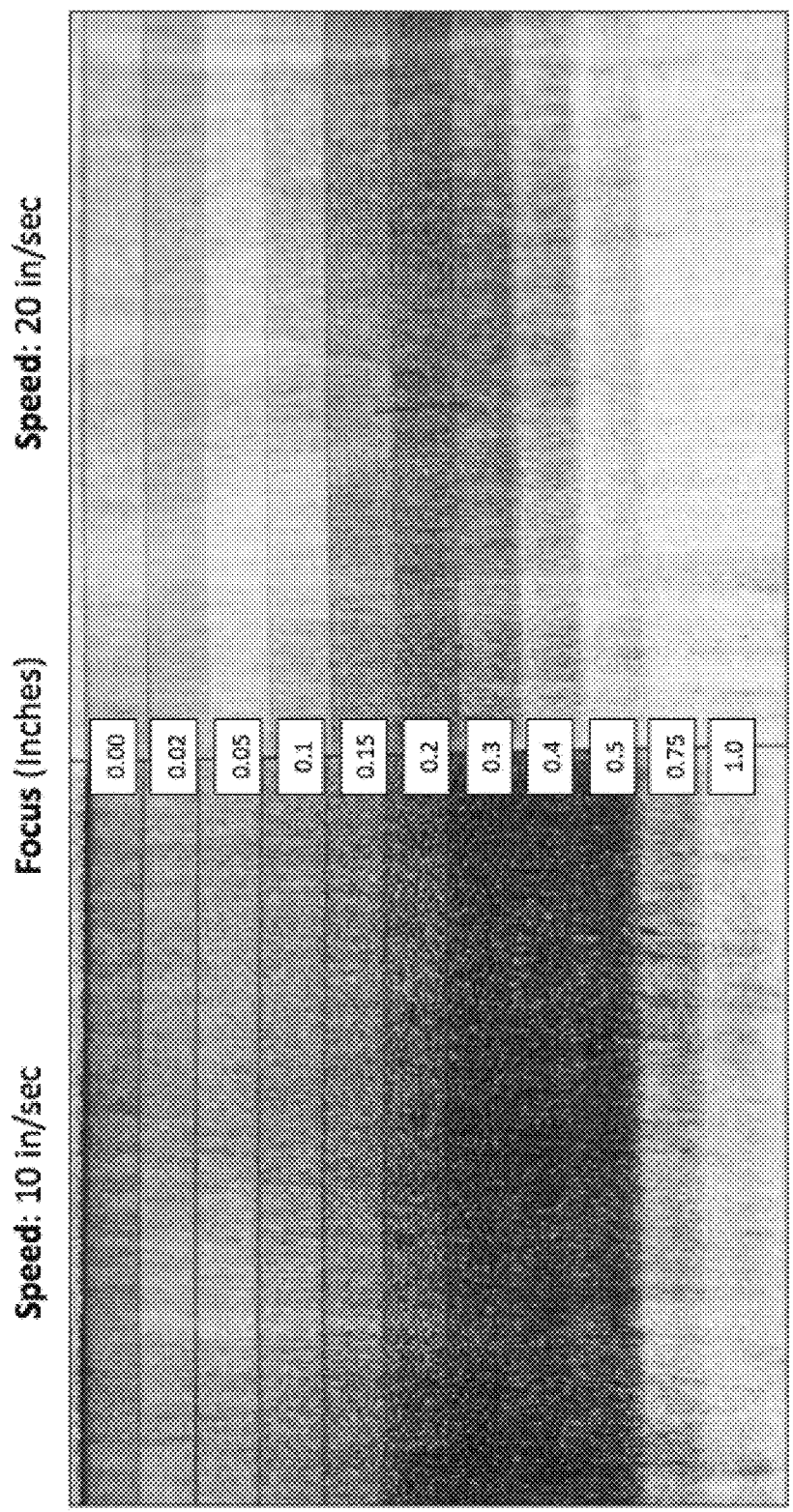
FIG. 15 is a series of images of a comparison of two different laser speeds changing the focal plane according to embodiments. The top number indicates the sample is in focus and the focal plane moves out of focus from top to bottom.

Previous research indicated that in order to cause wood to flow with minimal degradation, the heating and cooling must occur in a very short period of time. See C. C. Peters, H. L. Marshall, Cutting wood materials by laser, U.S. Forest Products Laboratory, Madison, Wis., 1975; Wust H., Haller P., Wiedemann G., Experimental study of the effect of a laser beam on the morphology of wood surfaces, 2007. The maximum laser speed of the equipment for vector scans was utilized in this experiment to minimize the amount of time the substrate was irradiated with the laser. FIG. 15 shows the surface irradiated with the laser as a function of laser speed (maximum and half maximum) and laser focus (in-focus to 2.5 cm out of focus).

FIG. 15 revealed that at a lower laser speed, a darker area is seen through a greater range of focal plane increments, indicating that the additional amount of laser exposure in anyone area leads to extended time at high temperatures resulting in charring. The sample moving at higher speed did not show any degree of charring, while charring was seen when the focal plane was moved 0.3 and 0.5 inches out of focus. This image is in congruence with previous research indicating that shorter time periods minimize charring. See Church and Renneckar, 2010 unpublished. Moving beyond a critical focal plane, the beam is so divergent that the radiation is not concentrated enough to modify the wood to any appreciable degree.

Due to the orthotropic nature of wood, heat transfer varies depending whether the laser passes parallel or perpendicular to the grain, with previous research indicating more charring occurring when moving the laser perpendicular to the grain. See McMillin C. W., 1971. Based on microscopic observation in a stereomicroscope, grain orientation had a minor effect on the degree of char and ablation relative to the large changes that were observed between focal planes, as seen in FIG. 15. For simplicity, all tests in the DOE utilized laser passes in the direction of the grain, to minimize variation, and charring.

Power

Figure 16:
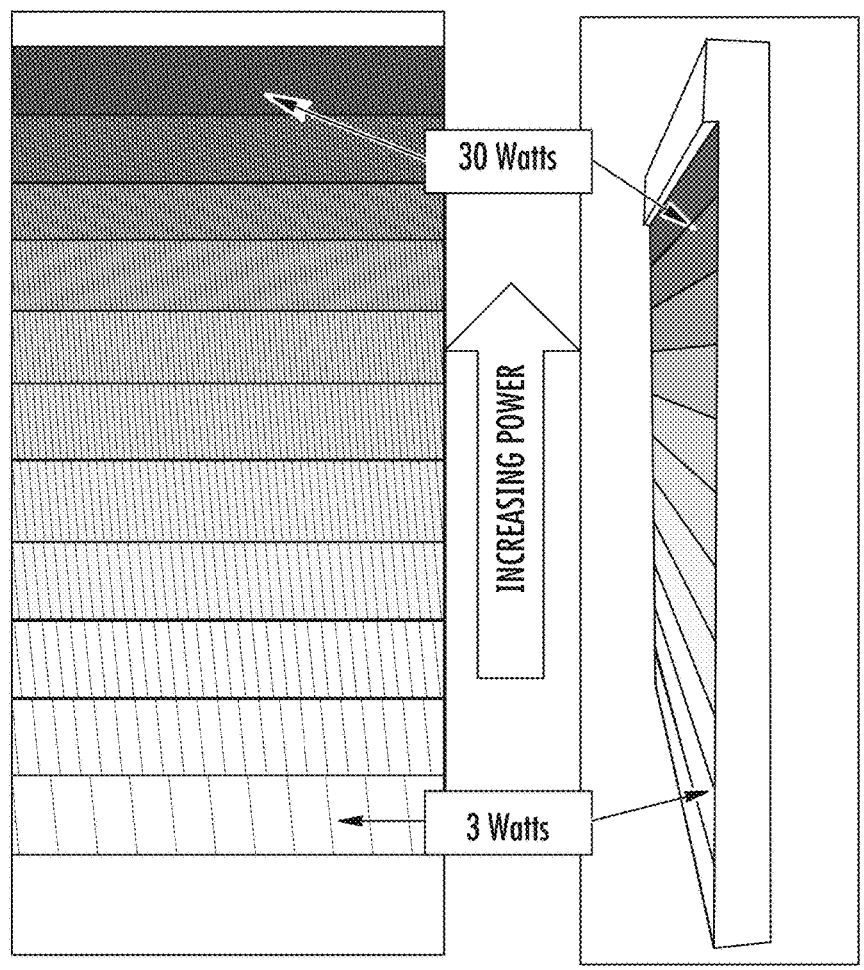
FIG. 16 depicts drawings showing the effects of increasing laser power on poplar according to embodiments of the invention, with the left drawing showing a front view and the right drawing showing a side view.

Keeping the laser speed and focus of the laser constant, the amount of power was evaluated. Surface modification, relative to its bulk appearance appeared to stay the same between 15 and 30 W, with higher laser fluences resulting only in more material removed via the ablation process (FIG. 16). As seen in the FIG. 16 there is increased material removed as the power was increased beyond 10 watts.

FIG. 16 is a front and edge view of poplar wood, laser modified in ~3 W steps from 3 to 30 Watts. Increasing power within this range, the modified surface starts to appear more consistent in color, while more material is removed via ablation. This upper 30 W clearly indicates the fact that the optimum laser power must not erode significant volume of the wood in order to minimize material loss. Therefore 3 to 15 Watts was the chosen range for the factor of power in the DOE. Consistently after laser modification, the poplar samples would lose on average 3% and 20% in thickness for 3 W and 15 W, respectively.

Ridges

Figures 17A, 17B, 17C:
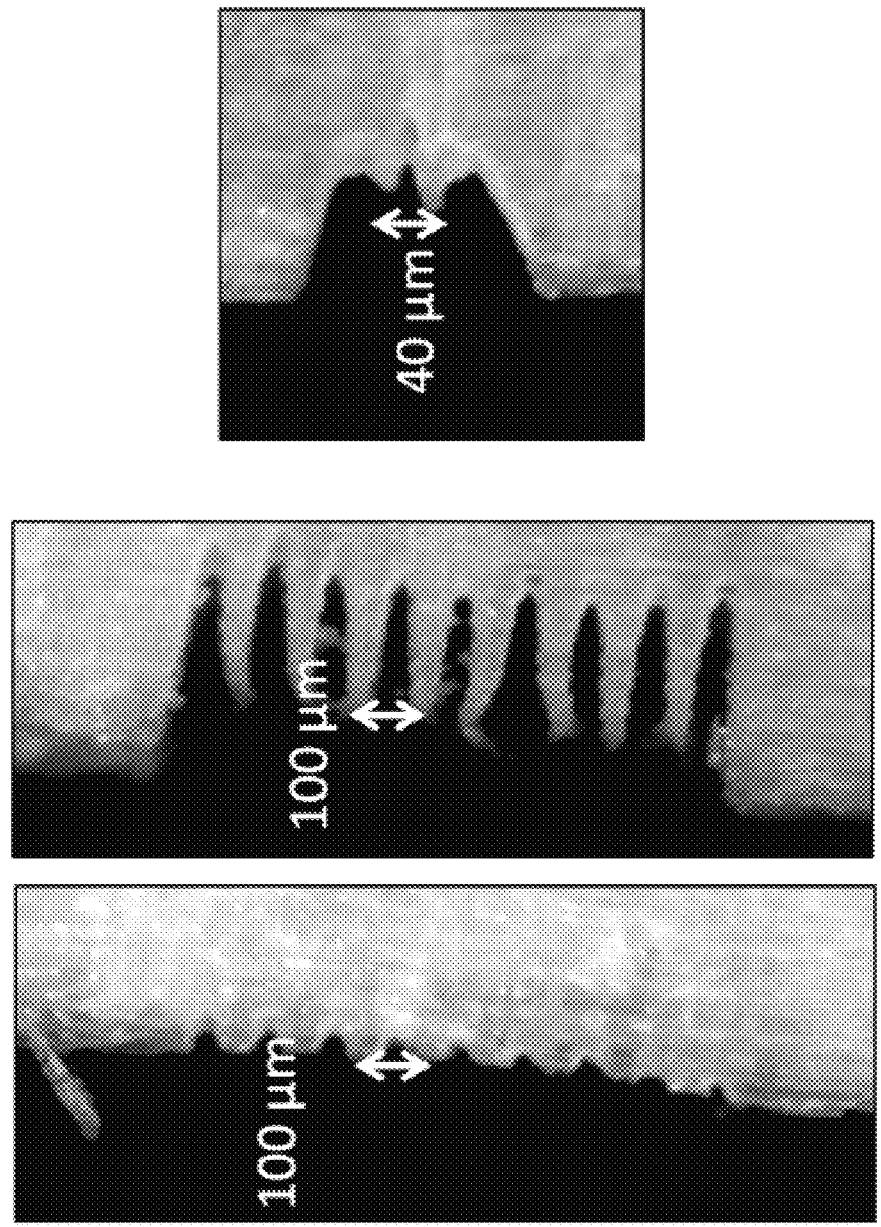
FIGS. 17A-17C show light microscopy images of ridges during the laser ablation of wood according to an embodiment of the invention, wherein FIG. 17A corresponds to 3 W laser power and FIG. 17B corresponds to 15 W laser power.

As the in-focus laser spot size was smaller than the resolution of the laser's motion system, ridges develop between laser lines during laser modification. In addition the Gaussian shape of the power of the laser beam creates a spot size with additional energy in the center. This is known to create "V" like grooves in micromachined polymethylmethacrylate. See Ji-Yen Cheng, Cheng-Wey Wei, Kai-Hsiung Hsua, Tai-Horng, Young, Direct-write laser micromachining and universal surface modification of PMMA for device development, Sensors and Actuators, B99 (2004) 186-96. As mechanical interlock of ridges may promote adhesion, the presence of the ridges may have a substantial effect on the bond strength, either negative or positive related to the orientation and the amount of surface contact. Two possibilities for positive effects of ridges include an increase in modified material and/or mechanical interlock. Since ridges increase the surface area, more modified material is at the surface versus a modified surface that is flat. The increased amount of modified wood may allow for more intimate contact while in the hot press. Mechanical interlock may increase the strength of the bond if enough ridges become interlocked. FIGS. 17A-C contains light microscopy images showing examples of ridges as a function of power and separation of raster lines (100 microns vs. 40 microns).

Shown in FIGS. 17A-C are light microscopy images illustrating ridges with the top portion showing the increased depth with increasing laser power, the right showing the resolution limitations of the laser system. These images display the significance of the ridges, appearing as micro finger-joints. Screening tests were done testing variables such as ridges/no ridges, ridges parallel, ridges perpendicular, and effect of grain direction.

Moisture Content of Wood

Laser ablation tests were performed on wood samples soaked in water for 24 hr. The surfaces of the wood were fully saturated after the water treatment relative to the conditioned samples. Both the conditioned samples and the fully saturated samples could be adhered together after laser modification. Qualitatively, it was observed that more energy is most likely required to laser modify wood with the higher moisture content. The result agrees with previous literature that indicated higher amounts of energy is required to achieve the same depth of ablation in wood with higher moisture contents. See Hendrik Wust e.a., Laserinduzierte Modifikationen an Holzoberflachen, Wissenschaftliche Zeitschrift der Technischen Universitat Dresden, 48 (1999) 66-72; Wust H., Haller P., Wiedemann G., Experimental study of the effect of a laser beam on the morphology of wood surfaces, 2007. This result is related to the change of heat transfer properties of the material and the absorption of infrared light by the water. For these wet samples bonding still occurred, showing the possibility that wood does not need to be dried during laser processing. In the DOE experiment, the moisture content was kept at 12%, which is a few percent higher than the normal in service moisture content. It should be highlighted that reduced drying requirements of the veneer saves energy and lowering operational costs, while the relative to adhesives that require dry substrate for bonding. See Rowell R., Handbook of wood chemistry and wood composites, 2005 ("Rowell R., 2005"). The moisture content may also change the chemistries of the surface of the wood (via wet-air oxidation process), possibly altering [mal chemistry of the laser modified wood.

As Received Surface Roughness of Wood

Laser activated wood bonding process is applied to plywood composites, issues with wood surface roughness, both from natural heterogeneity to surface features. Created by the peeling process, known as knife checks, create surface roughness. Without a thick adhesive bond layer, surface roughness most likely has higher consequences on the [mal bond strength due to less intimate contact between each wood ply. Although an important feature, only "Grade A" poplar veneers were utilized in this experiment. Surface roughness of wood was minimized by utilizing higher grade veneer irradiating the tight side of the veneer. In screening tests, the loose side could easily become bonded, but caused wider variance in the test data; this limited the identification of important parameters and all samples were subsequently irradiated on their tight side.

Growth Rings/Plane of Irradiation

Previous research found a 50 to 200 percent difference in ablation depth between earlywood and latewood, showing that the local structure of the wood is a significant in laser modification. The amount of early wood and late wood on a surface can be altered by how the wood is cut, i.e. quarter sawn versus flat sawn. In the case of the wood veneers utilized, all wood was peeled and therefore the plane that was irradiated with the laser was tangential to the growth rings. It was observed that the grain pattern appeared as a photo-negative of the original piece for the southern yellow pine veneers. The earlywood appeared to be darker than the latewood. While this factor cannot be controlled, it is noted as a potential cause of variance.

DOE Results

DOE is an experimental system that tests multiple factors for statistical significance, as well as testing factors for interaction effects, while reducing the amount of tests. Table 9 contains the values for all test specimens used in the DOE experimentation. As can be noted in the data, the range in average tensile strength values are from 0 MPa to 2.82 MPa. Some combination of parameters causes the samples to completely fail prior to testing.

TABLE 9

Yellow poplar shear strength data for DOE analysis, triplicates tests averaged

| Power (Watt) | Pressure (MPa) | Temperature (° C.) | Time (m) | Focus (inch) | Average Shear Strength (MPa) |
| --- | --- | --- | --- | --- | --- |
| 3 | 0.7 | 140 | 12 | 0 | 0.97 ± 0.32 |
| 3 | 0.7 | 165 | 3 | 0.2 | 0.00 ± 0.00 |
| 3 | 1.6 | 140 | 7.5 | 0.2 | 0.00 ± 0.00 |
| 3 | 1.6 | 190 | 12 | 0.2 | 0.00 ± 0.00 |
| 3 | 2.4 | 140 | 3 | 0.2 | 0.00 ± 0.00 |
| 3 | 2.4 | 140 | 12 | 0.2 | 0.00 ± 0.00 |
| 3 | 2.4 | 190 | 3 | 0 | 2.79 ± 0.64 |
| 3 | 2.4 | 190 | 12 | 0 | 2.31 ± 0.43 |
| 9 | 0.7 | 140 | 12 | 0.2 | 1.22 ± 0.12 |
| 9 | 0.7 | 190 | 7.5 | 0 | 1.71 ± 0.37 |
| 9 | 1.6 | 165 | 3 | 0 | 2.19 ± 0.35 |
| 9 | 1.6 | 190 | 3 | 0.2 | 2.14 ± 0.48 |
| 9 | 2.4 | 140 | 7.5 | 0 | 2.73 ± 0.46 |
| 9 | 2.4 | 165 | 7.5 | 0.2 | 2.32 ± 0.17 |
| 15 | 0.7 | 140 | 3 | 0 | 1.42 ± 0.23 |
| 15 | 0.7 | 165 | 7.5 | 0.2 | 1.04 ± 0.07 |
| 15 | 1.6 | 165 | 12 | 0 | 1.75 ± 1.53 |
| 15 | 2.4 | 140 | 3 | 0.2 | 2.12 ± 0.36 |
| 15 | 2.4 | 190 | 3 | 0 | 2.79 ± 0.03 |
| 15 | 2.4 | 190 | 12 | 0.2 | 2.82 ± 0.52 |

Table 9 outlines the levels of various factors in combinations utilized for the DOE, 20 different set points, 3 replicates of each point. Although the data needs to be modeled for proper analysis, several conclusions can be made with raw data. Lower laser powers of 3 watts tend to have a higher tendency to result in no shear strength, or low shear strength values. This lack of shear strength shows that 3 Watts of laser power may not be adequate for optimal laser modification for bonding. Also, aside from the combination of 190° C. and 3 Watts, tests including 190° C. platen temperatures resulted in higher shear strengths. The higher temperature may allow the modified wood surface to flow more than at lower temperatures, as well improve the thermal conductivity of the wood therefore increasing the efficiency of heat transfer from platen to bond line. When low wattage is used it must be completely in focus; else the power delivered at the surface is not great enough for modification to achieve bonding.

The significance of each factor or interaction is described by the probability of the variable or interaction among variables, outlined in the probability Table 10.

TABLE 10

P Values for DOE Model for Shear-strength of yellow-poplar samples

| Parameter Estimates | P Value |
| --- | --- |
| Pressure | <.0001 |
| Power | <.0001 |
| Focus | <.0001 |
| Power*Power | <.0001 |
| Power*Focus | <.0001 |
| Pressure*Temperature | 0.0006 |
| Power*Pressure | 0.0142 |
| Power*Temperature | 0.0381 |

The P values in Table 10 include all the parameters that are significant, or have a P value of less than 0.05. The chart indicates that several factors are significant as well as interactions between factors. The Power*Power term being significant indicates that there is a second order interaction occurring. This second order interaction is indicative of the first order curvature, in this case negative, verifying that the first order curve is concave down as seen later in the prediction profiler. Statistical proof of a concave down verifies that the maximum laser power is within the constraints utilized in the DOE. Additionally, the DOE was conducted with a pine species as well as poplar. Similar trends among all 5 factors tested were observed for pine, along with a DOE modeled maximum strength approximately 30% higher than found for poplar. When the DOE model is created using the significant variables, bond shear strength is reported to be a maximum of 3.5 MPa.

While the screening tests did determine significant variables and levels, 2 of the 5 main variables appeared to have optimal values outside of the chosen limits.

Figure 18:
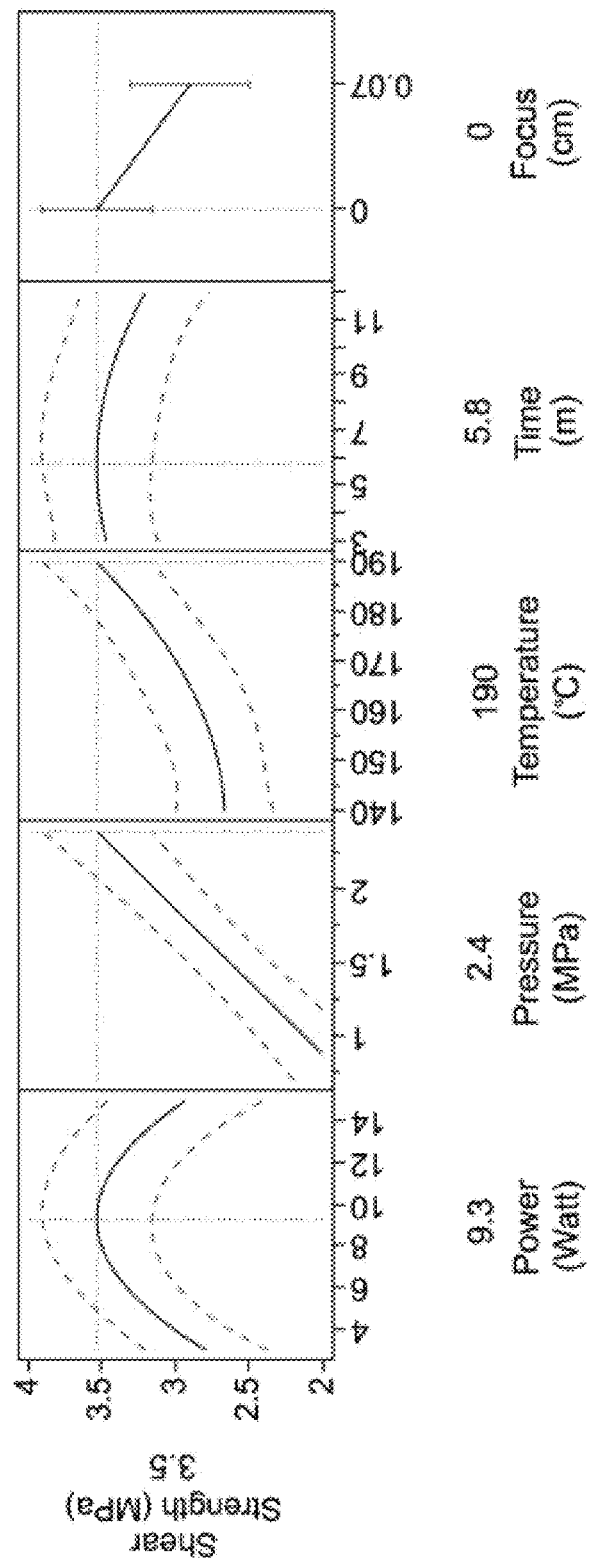
FIG. 18 shows a series of graphs representing a prediction profiler indicating estimations of factors and their effect on shear strength for yellow-poplar substrates according to embodiments of the invention.

The prediction profiler shown in FIG. 18 shows that when ignoring interactions, the optimum laser power and press time were found to be within the limits of the DOE, at 9.5 W and 6.4 minutes. The time prediction profiler illustrates that although the maximum strength is achieved at 6.4 minutes; similar strengths can be achieved between 3 and 6 minutes, while the strength of the bond decreases after 6 minutes, possibly indicative of thermal degradation of the modified wood.

As evident from the DOE prediction profiler in FIG. 18, pressure and temperature profiles appear to indicate that the optimal values may lie outside of the limits placed upon those particular factors in this DOE. These limits approach physical limitations of the system. Higher strengths may be achieved as long as the wood or modified wood is not crushed by increased pressure. However, this factor may provide justification into investigating the laser treatment for strand composites, as wood typically is densified during hot-pressing of particle board and oriented strand board. Exposure to higher temperatures will lead to thermal degradation of woody components, potentially impacting performance, dependent upon weight loss. In summary, though both temperature and pressure appear to have maximums outside the testing region, only pressure should be increased for possible improvements in strength.

The laser focus shows a slight improvement in shear strength when in focus, than when out of focus. Both levels of modification and the possibility of interlocking grain could be factors contributing to this difference. However, it was not observed via visible inspection of the failed surface that wood became interlocked. It is more likely the differences are related to contact area.

As is common with many processes, interactions between factors, positive or negative, occurs. The most significant interaction found with the five variables tested in the DOE was between press temperature and pressure, as seen in FIG. 18.

Figure 19:
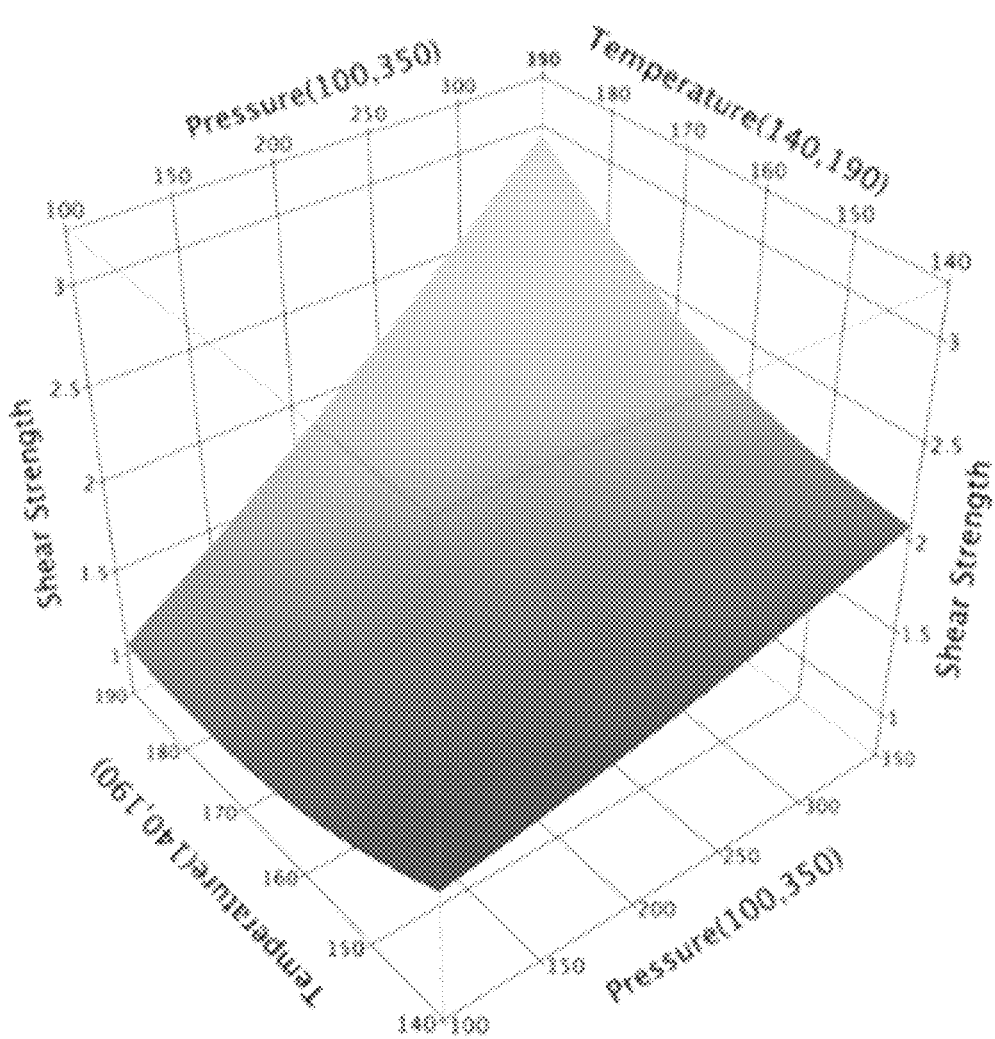
FIG. 19 is a surface profiler graph illustrating the interaction between temperature and pressure according to an embodiment of the invention.

The surface profile in FIG. 19 displays the interaction between temperature and pressure indicating a synergistically positive effect when increasing both pressure and temperature. Higher temperatures allow the bonding material to be increased further above the softening temperature of the modified wood, while the pressure allows this material to achieve greater contact between surfaces.

Visual inspection of the fractured surface was performed on the samples for the DOE tests. Typically low strength failures resulted in wood failures of less than 5%. Failures at shear strengths above 2 MPa exhibited wood failures on the order of 5-50%. There were no test specimens that had 100% wood failure out of the bonding plane.

Comparison to Industrial Adhesives

Tensile shear strength tests were performed on both pine and poplar samples bonded with a commercial PF adhesive. The result of the tensile strength for poplar bonded with the PF resin was that it had average values of 1.7 MPa. Pine samples had slightly lower shear strength at 1.4 MPa. These values fell within the range of values tested for the laser-modified shear tests (Table 11).

TABLE 11

Tensile shear strength of southern yellow pine and yellow-poplar bonded by laser modification or PF resin

| Wood Species | Bond Method | Shear Strength (MPa) | Average Wood Failure (%) |
|---|---|---|---|
| Pine | PF Adhesive | 1.4 ± 0.2 | 20 |
| Pine | Laser | 1.0 ± 0.4 | 4 |
| Poplar | PF Adhesive | 1.7 ± 0.4 | 27 |
| Poplar | Laser | 0.6 ± 0.2 | 0 |

Flexural tests using a 3-point bending set-up were performed on both pine and poplar that were laser modified using optimal values found in the DOE or bonded via PF resin. The results for bending modulus (MOE) and bending strength (MOR) for each sample type are seen in Table 4.

For pine samples adhered with the laser-modified surface, both strength and stiffness values are slightly greater than the samples bonded with the commercial PF adhesive. However, there seems to be a species effect not seen in the tensile shear specimens, as the poplar samples bonded using the laser process has lower values than what is reported for the pine samples and PF samples. The higher strengths seen with the pine may be attributed to the higher bond strength, or inherent material properties of pine.

Table 4 indicates that bonding laser modified pine together achieves flexural mechanical properties similar to that of wood bonded by PF resin. The Wood Handbook lists typical plywood sheathing values in the range of 20.7 to 48.3 MPa for flexural strength and 6.89 to 13.1 GPA for flexural MOE. Hence, laser modified wood bonded falls in the performance range for MOE and exceeds the MOR values for both species.

Discussion

Optimization of DOE Parameters

Increased pressure typically results in better bonding in plywood manufacturing utilizing PF adhesives due to enhanced intimate contact between wood and adhesive, up to a certain point before the crushing of wood structure and subsequent strength loss occurs. See Rowell R., 2005. It was revealed that higher pressure correlated with the bond strength, suggesting that the higher pressure facilitated intimate contact of bond lines. With rough cut surfaces, as occurs with rotary peeled veneers, it is intuitive that the higher pressure would enhance adhesion.

A previous report revealed the laser-modified wood from a hardwood species undergoes a thermal transition at 130° C. As the laser-modified wood samples are raised to higher temperatures above its $T_g$, the surface can undergo flow and behave like a thermoplastic material. It was noted in previous experiments that the glass transition temperature shifts to higher temperatures with heating the isolated layer of laser-modified wood material to 180° C. This response is a hallmark of thermosetting materials, indicating "curing" of the adhesive. As temperature appeared as a factor in the DOE response, it appears that it impacts the bonding mechanism. However, there was no strong effect of time, or interaction between time and temperature, suggesting that the kinetics of a thermochemical reaction occurred by three minutes or did not occur in this system. While no specific mechanism has been identified within this study, the friction welding of wood indicated in the introduction section, reports that frictional heating can crosslink degraded polysaccharide components (like hydroxymethyl furfural) with lignin fragments.

In those studies it was hypothesized that the bonding occurs when amorphous polymeric materials, primarily lignin but also some hemicelluloses flow, causing a partial detachment of long wood cells and fibers. Once heat is removed the system solidifies, thereby creating a wood cell fiber entanglement network whose matrix is composed of once molten woody polymers. See Gfeller B., Wood bonding by vibrational welding, Journal of Adhesion Science Technology, 17 (2003) 1573-89; OMRANI, #160, P., Bocquet, J.-F., Pizzi, et al., Zig-zag rotational dowel welding for exterior wood joints, Brill, Leiden, PAYS-BAS, 2007. Utilizing SEM and $^{13}$CNMR verified both the network composite structure and its components. It is hypothesized that bonding occurs under a similar mechanism for laser activated wood bonding, but with perhaps more polymer flow, with a rearrangement of the cellulose component, and less fiber entanglement combined with potentially some mechanical interlock of ridges. With the current study it is not possible to conclude that the same mechanism occurs, but it appears that there is precedent that wood to wood bonding can occur.

Based upon empirical observations it is suggested that adhesion between wood surfaces occurs because the laser-modified surface layer is able to undergo interactions at the above temperatures; subsequently, heating the samples and pressing together two rubbery surfaces, intimate contact is established and bonding occurs. The samples have mechanical integrity when removed from the hot press. Preliminary tests show some water resistance (data not shown) suggesting chemical bonding occurs.

CONCLUSION

Wood surfaces were lasering modified and subsequently hot-pressed together creating wood composites without any added adhesive. A combination of screening tests and a Design of Experiment furthered the understanding of the laser activated wood bonding method, yielding significant parameters for both the laser modification (power and focus) and subsequent bonding (hot press pressure, and a pressure/temperature interaction parameter). By modeling the DOE data, it was determined that the maximum strength within the parameter limits chosen for the DOE will result in shear strengths of 3.5 MPa. There was a minimum energy density required which was controlled by the laser wattage and focus spot size. Both the shear strengths as well as flexural strengths of the laser modified wood bonding method were comparable to strengths of PF bonded specimens. Taken together, a new method of bonding wood is reported that has some performance characteristics of traditional wood adhesives, but does not require any additives.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background information detailing the level of ordinary skill in the art.

The invention claimed is:

1. A process for bonding lignocellulosic substrates comprising:
   providing a first and second lignocellulosic substrate, wherein each substrate comprises a surface intended for bonding;
   pre-treating the surfaces intended for bonding of the first and second substrates by exposing the surfaces to a heating source, to create a first and second modified surface prepared for bonding; and
   pressing the first and second modified surfaces together at a pressure of at least 0.7 MPa and temperature of at least 100° C. over a sufficient time interval to form one or more bonds between the modified surfaces, such that the two lignocellulosic substrates are bonded together to form a composite without the addition of an adhesive;
   wherein the pre-treating step and pressing step are not simultaneous;
   wherein there is at least a five minute delay between an end of the pretreatment step and a beginning of the pressing step.

2. The process of claim 1, wherein the modified surfaces include chemical changes such that the surfaces may form chemical bonds with one another.

3. The process of claim 1, wherein the modified surfaces include physical changes such that the surfaces may form mechanical bonds with one another.

4. The process of claim 1, wherein the one or more bonds formed between the modified surfaces are mechanical bonds, chemical bonds, or a combination of mechanical and chemical bonds.

5. The process of claim 1, wherein the heating source is a form of radiation.

6. The process of claim 5, wherein the form of radiation is coherent light.

7. The process of claim 6, wherein the coherent light is provided by a laser.

8. The process of claim 1, wherein the heating source is a carbon dioxide laser.

9. The process of claim 5, wherein the form of radiation is infrared radiation.

10. The process of claim 9, wherein the source of radiation is a heat lamp.

11. The process of claim 1, wherein the temperature is between 140-190° C.

12. The process of claim 1, where in the time interval is at least 1 minute.

13. A process for bonding lignocellulosic substrates comprising:

providing a first and second lignocellulosic substrate, wherein each substrate comprises a surface intended for bonding;

providing one or more additional lignocellulosic substrate, wherein the additional substrate comprises a surface intended for bonding;

pre-treating the surfaces intended for bonding of the first and second substrates by exposing the surfaces to a heating source, to create a first and second modified surface prepared for bonding;

irradiating a pair of opposed surfaces intended for bonding of the first, second, or additional substrate with infrared light, to create a third and fourth modified surface prepared for bonding; and first pressing the first and second modified surfaces together at sufficient pressure and temperature over a sufficient time interval to form one or more bonds between the modified surfaces, such that the two lignocellulosic substrates are bonded together to form a composite without the addition of an adhesive;

second pressing the third and fourth modified surfaces together at a pressure of at least 0.7 MPa and a temperature of at least 100° C. to form one or more bonds between the modified surfaces, such that a multi-ply composite is formed without using an added adhesive;

wherein the pre-treating step and the pressing steps are not simultaneous;

wherein the multi-ply composite is a plywood of at least three layers or an oriented strand board.

14. The process of claim 1, wherein the surfaces intended for bonding are planar.

15. The process of claim 1, wherein the pressing step is carried out by a hot press.

16. A process for bonding lignocellulosic substrates comprising:

providing a first and second lignocellulosic substrate, wherein each substrate comprises a surface intended for bonding;

pre-treating the surfaces intended for bonding of the first and second substrates by exposing the surfaces to a heating source, to create a first and second modified surface prepared for bonding;

pressing the first and second modified surfaces together at sufficient pressure and temperature over a sufficient time interval to form one or more bonds between the modified surfaces; such that the two lignocellulosic substrates are bonded together to form a composite without the addition of an adhesive;

heating the composite at 150° C.-250° C. for up to two hours after it is formed;

wherein the pre-treating step and pressing step are not simultaneous.

17. The process of claim 13, wherein the temperature is at least 140° C.

18. The process of claim 1, wherein the temperature is between 100° C.-190° C.

19. The process of claim 13, wherein the temperature is between 100° C.-190° C.

* * * * *